United States Patent
Onishi

(10) Patent No.: US 9,231,634 B2
(45) Date of Patent: Jan. 5, 2016

(54) COMPENSATION APPARATUS AND WIRELESS COMMUNICATION EQUIPMENT

(71) Applicant: SUMITOMO ELECTRIC INDUSTRIES, LTD., Osaka-shi, Osaka (JP)

(72) Inventor: Masahiko Onishi, Osaka (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 14/425,859

(22) PCT Filed: Aug. 22, 2013

(86) PCT No.: PCT/JP2013/072434
§ 371 (c)(1),
(2) Date: Mar. 4, 2015

(87) PCT Pub. No.: WO2014/050382
PCT Pub. Date: Apr. 3, 2014

(65) Prior Publication Data
US 2015/0222309 A1    Aug. 6, 2015

(30) Foreign Application Priority Data
Sep. 25, 2012 (JP) ................. 2012-210799

(51) Int. Cl.
H04B 1/10    (2006.01)
H04B 1/12    (2006.01)
H04L 27/22   (2006.01)
H04B 1/16    (2006.01)
H04L 27/38   (2006.01)
H04B 1/26    (2006.01)

(52) U.S. Cl.
CPC ............. *H04B 1/123* (2013.01); *H04B 1/10* (2013.01); *H04B 1/16* (2013.01); *H04B 1/26* (2013.01); *H04L 27/22* (2013.01); *H04L 27/38* (2013.01); *H04L 27/389* (2013.01)

(58) Field of Classification Search
USPC ................. 375/316, 322, 324, 346, 350
See application file for complete search history.

(56) References Cited

U.S. PATENT DOCUMENTS 7,382,297 B1 * 6/2008 Kopikare et al. ............. 341/118
2002/0057752 A1   5/2002 Denno
2004/0183680 A1   9/2004 Thompson et al.
(Continued)

FOREIGN PATENT DOCUMENTS

JP    2002-199039 A    7/2002
JP    2005-197968 A    7/2005
(Continued)

*Primary Examiner* — Khanh C Tran
(74) *Attorney, Agent, or Firm* — Drinker Biddle & Reath LLP

(57) ABSTRACT

A compensation apparatus is provided which performs a compensation process of removing an image component in a quadrature-demodulated signal. The compensation apparatus includes a quadrature demodulation compensation section that compensates for the quadrature-demodulated signal including an I signal and a Q signal. The quadrature demodulation compensation section is configured to perform a compensation process of compensating for a characteristic difference between the frequency characteristic of a first filter that performs filtering of the I signal and the frequency characteristic of a second filter that performs filtering of the Q signal.

6 Claims, 20 Drawing Sheets

(56) References Cited

U.S. PATENT DOCUMENTS

| | | |
|---|---|---|
| 2004/0184562 A1* | 9/2004 | Wang et al. .................... 375/322 |
| 2005/0147190 A1 | 7/2005 | Nishikawa |
| 2009/0088120 A1 | 4/2009 | Ling et al. |
| 2011/0110790 A1 | 5/2011 | Itzel et al. |
| 2012/0087451 A1* | 4/2012 | Razzell .......................... 375/350 |
| 2014/0064406 A1* | 3/2014 | Onishi ........................... 375/297 |
| 2014/0140379 A1* | 5/2014 | Teplitsky et al. .............. 375/219 |
| 2014/0140444 A1* | 5/2014 | Onishi et al. .................. 375/320 |

FOREIGN PATENT DOCUMENTS

| | | |
|---|---|---|
| JP | 2007-184784 A | 7/2007 |
| JP | 2010-130630 A | 6/2010 |
| JP | 2010-541486 A | 12/2010 |
| JP | 2011-163344 A | 8/2011 |
| JP | 2011-163374 A | 8/2011 |
| WO | WO-2004/082232 A1 | 9/2004 |
| WO | WO-2011/096297 A1 | 8/2011 |

* cited by examiner

FIG. 8

| LPF | CIRCUIT | BEFORE COMPENSATION | 2N=0 | 2N=2 | 2N=4 | 2N=6 | 2N=8 |
|---|---|---|---|---|---|---|---|
| LPF-A | No1 | -39.7 | -51.9 | -60.2 | -68.2 | -68.5 | -68.5 |
| | No2 | -46.1 | -51.8 | -62.3 | -65.6 | -65.7 | -65.7 |
| | No3 | -56.6 | -60.8 | -64.5 | -68.6 | -68.7 | -68.8 |
| | No4 | -52.0 | -58.7 | -62.6 | -65.5 | -65.7 | -65.6 |
| LPF-B | No1 | -35.3 | -47.5 | -65.8 | -68.0 | -68.0 | -67.9 |
| | No2 | -38.2 | -51.0 | -61.1 | -68.6 | -68.5 | -68.4 |
| | No3 | -44.5 | -57.4 | -59.7 | -66.5 | -66.2 | -66.8 |
| | No4 | -41.1 | -56.1 | -66.9 | -68.0 | -67.1 | -67.4 |
| LPF-C | No1 | -44.4 | -54.6 | -62.4 | -67.5 | -67.2 | -67.6 |
| | No2 | -33.2 | -37.4 | -48.4 | -67.8 | -67.2 | -67.8 |
| | No3 | -33.1 | -47.4 | -60.7 | -67.6 | -67.8 | -67.8 |
| | No4 | -33.7 | -45.8 | -61.5 | -67.4 | -67.0 | -67.2 |

[UNIT = dBc]

$$\begin{pmatrix} R'_I(n \cdot T) \\ R'_Q(n \cdot T) \end{pmatrix} = \begin{pmatrix} R_{11} & 0 & \cdots & 0 & \cdots & 0 \\ R_{21} & R_{22} \cdot k_{-N} & \cdots & R_{22} \cdot k_{-1} & R_{22} \cdot k_0 & R_{22} \cdot k_1 & \cdots & R_{22} \cdot k_N \end{pmatrix} \begin{pmatrix} R_I(n \cdot T) \\ R_Q((n-N) \cdot T) \\ \vdots \\ R_Q((n-1) \cdot T) \\ R_Q(n \cdot T) \\ R_Q((n+1) \cdot T) \\ \vdots \\ R_Q((n+N) \cdot T) \end{pmatrix} + \begin{pmatrix} dc_1 \\ dc_2 \end{pmatrix} \quad \cdots (2)$$

(b)

$$\begin{pmatrix} Rxsig\_re[n] \\ Rxsig\_im[n] \end{pmatrix} = \begin{pmatrix} Rtmp_{11} & 0 & \cdots & 0 & \cdots & 0 \\ Rtmp_{21} & Rtmp_{22} \cdot ktmp_{-N} & \cdots & Rtmp_{22} \cdot ktmp_{-1} & Rtmp_{22} \cdot ktmp_0 & Rtmp_{22} \cdot ktmp_1 & \cdots & Rtmp_{22} \cdot ktmp_N \end{pmatrix} \begin{pmatrix} Refsig\_re[n] \\ Refsig\_im[n-N] \\ \vdots \\ Refsig\_im[n-1] \\ Refsig\_im[n] \\ Refsig\_im[n+1] \\ \vdots \\ Refsig\_im[n+N] \end{pmatrix} \quad \cdots (3)$$

COMPENSATION APPARATUS AND WIRELESS COMMUNICATION EQUIPMENT

TECHNICAL FIELD

The present invention relates to a compensation apparatus and wireless communication equipment.

BACKGROUND ART

When a quadrature-modulated signal is received, quadrature demodulation for the received signal needs to be performed. Such quadrature demodulation is disclosed in Patent Literature 1.

CITATION LIST

Patent Literature

PATENT LITERATURE 1: Japanese Laid-Open Patent Publication No. 2010-130630

SUMMARY OF INVENTION

Technical Problem

When quadrature demodulation is performed by analog signal processing as described in Patent Literature 1, a received signal might be distorted by a quadrature demodulator.

Such distortion is caused by deviation of quadrature in the quadrature demodulator, I/Q gain imbalance (I/Q imbalance in an analog quadrature demodulator), or the like. The distortion caused by deviation of quadrature or IQ gain imbalance (I/Q imbalance) is called an image component.

Through studies on a compensation process for removing such an image component, the inventor of the present invention has found that there are cases where an image component cannot be sufficiently removed even if deviation of quadrature or IQ gain imbalance (I/Q imbalance) is simply compensated.

That is, an I signal and a Q signal output from a quadrature demodulator may be respectively subjected to filtering using filters such as low-pass filters (LPF). Due to variation in constants of elements (inductor, capacitors, etc.) constituting the filters or variation in mounting at the time of circuit manufacture, a characteristic difference may be generated between the frequency characteristic of the filter for the I signal and the frequency characteristic of the filter for the Q signal.

The inventor of the present invention has found that the difference in frequency characteristic between the filters causes insufficient removal of the image component.

The present invention is based on the new finding that the difference in frequency characteristic between the filters causes insufficient removal of the image component, and an object of the present invention is to realize more effective removal of the image component by taking into consideration the difference in frequency characteristic between the filters.

Solution to Problem

An aspect of the present invention is a compensation apparatus that performs a compensation process of removing an image component in a quadrature-demodulated signal. The compensation apparatus includes a quadrature demodulation compensation section that compensates for the quadrature-demodulated signal including an I signal and a Q signal. The quadrature demodulation compensation section is configured to perform a compensation process of compensating for a characteristic difference between frequency characteristic of a first filter that performs filtering of the I signal and frequency characteristic of a second filter that performs filtering of the Q signal.

The present invention can be realized not only as such a characteristic compensation apparatus or wireless communication equipment including the compensation apparatus but also as a system including the compensation apparatus or the wireless communication equipment. In addition, the present invention can be realized as a method including steps of characteristic processes performed in the compensation apparatus or the wireless communication equipment, or as a program for causing a computer to execute such steps. Further, the present invention can be realized as a semiconductor integrated circuit that realizes part or entirety of the compensation apparatus or the wireless communication equipment. The above program can be stored in a storage medium such as a CD-ROM.

Advantageous Effects of Invention

According to the present invention, removal of the image component can be performed more effectively by reducing the cause of the insufficient removal of the image component.

BRIEF DESCRIPTION OF DRAWINGS

FIG. 8 is a table representing an evaluation result of image suppression performance of the quadrature demodulation compensation section shown in FIG. 4.

FIG. 21(*a*) shows Equation 2 representing a compensation process performed by the quadrature demodulation compensation section 7 shown in FIG. 4, and FIG. 21(*b*) shows Equation 3 representing an image component.

DESCRIPTION OF EMBODIMENTS

Summary of Embodiment

Figure 1:
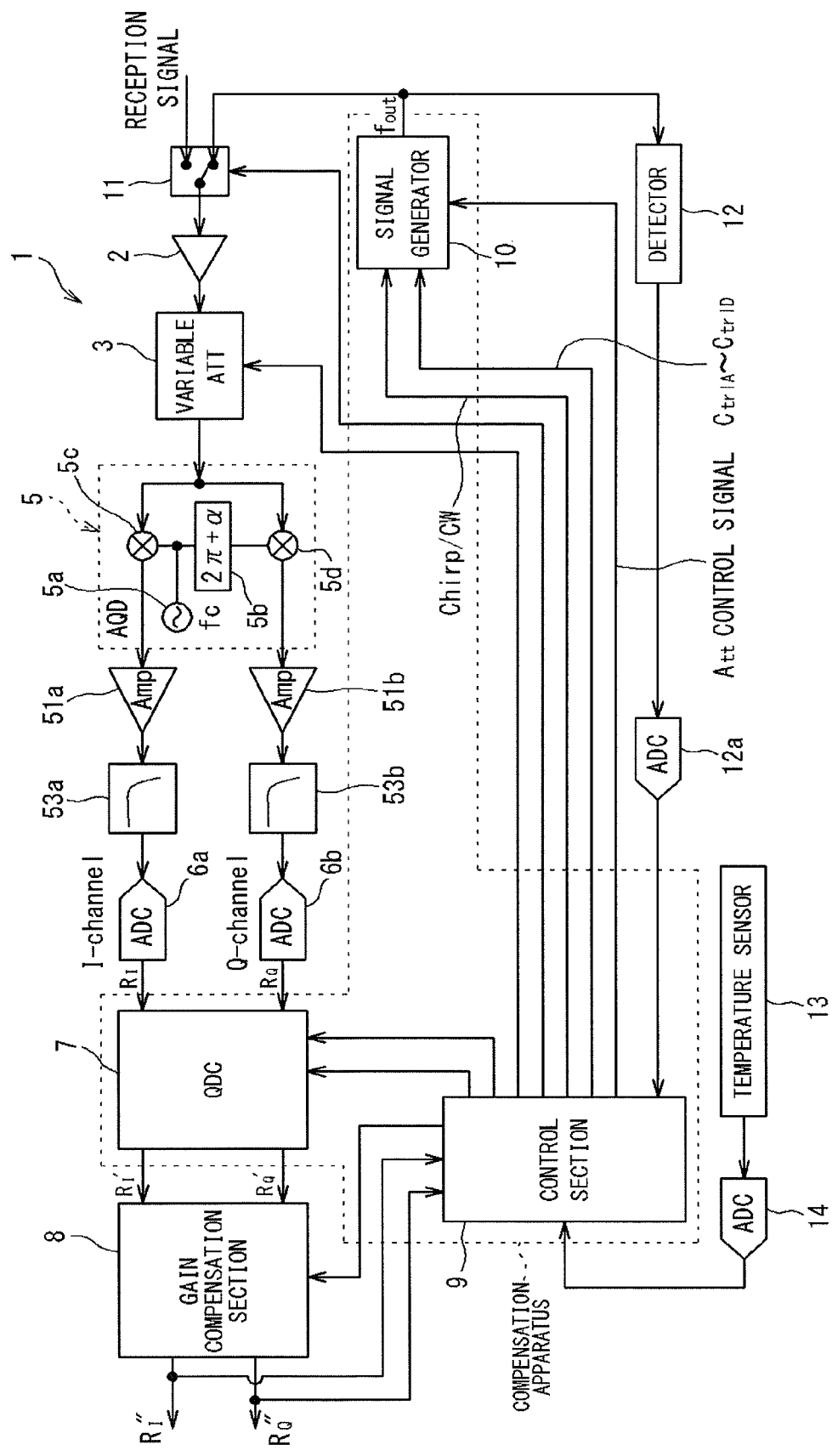
FIG. 1 is a block diagram showing wireless communication equipment (receiver).

Hereinafter, the content of an embodiment will be described according to the following (1) to (7).

(1) An embodiment according to an aspect of the present invention is a compensation apparatus that performs a compensation process of removing an image component in a quadrature-demodulated signal. The compensation apparatus includes a quadrature demodulation compensation section that compensates for the quadrature-demodulated signal including an I signal and a Q signal. The quadrature demodulation compensation section is configured to perform a compensation process of compensating for a characteristic difference between frequency characteristic of a first filter that performs filtering of the I signal and frequency characteristic of a second filter that performs filtering of the Q signal.

According to the above aspect of the present invention, since the difference in frequency characteristic between the first filter and the second filter can be compensated, the cause of insufficient removal of the image component can be reduced to realize more effective removal of the image component.

(2) The compensation process performed by the quadrature demodulation compensation section is preferably a process of removing an image component caused by a quadrature demodulator that outputs the quadrature-demodulated signal, and compensating for the characteristic difference. In this case, it is possible to remove the image component caused by the quadrature demodulator, and compensate for the difference in frequency characteristic between the first filter and the second filter.

(3) The first filter and the second filter are preferably analog filters. The quadrature demodulation compensation section is preferably configured to receive digital signals into which the analog I and Q signals output from the first filter and the second filter have been converted, and perform the compensation process by digital signal processing. In this case, the difference in frequency characteristic between the first filter and the second filter, which are analog filters, can be compensated by digital signal processing.

(4) Preferably, the quadrature demodulation compensation section includes a delay section that performs delay processing for at least one of the I signal and the Q signal, and the delay section suppresses a group delay difference between a group delay caused by the first filter and a group delay caused by the second filter. In this case, the difference in frequency characteristic between the first filter and the second filter can be compensated by suppressing the group delay difference caused by the difference in frequency characteristic.

(5) Preferably, the delay section includes a first delay processing section that performs delay processing for one of the I signal and the Q signal, and a second delay processing section that performs delay processing for the other one of the I signal and the Q signal. Preferably, the first delay processing section is configured to cause a delay of a predetermined delay amount in the one signal, and the second delay processing section is configured to be able to perform a first process of causing a delay of a delay amount smaller than the predetermined delay amount of the delay caused by the first delay processing section, and a second process of causing a delay of a delay amount larger than the predetermined delay amount of the delay caused by the first delay processing section. In this case, it is possible to cope with a situation where it is unknown which of the I signal and the Q signal is delayed.

(6) When the first filter and the second filter each have an order of N, the second delay processing section preferably has an order set to 2N or lower. In this case, the difference in frequency characteristic between the first filter and the second filter can be reliably compensated by the second delay processing section.

(7) Another aspect of the present invention is wireless communication equipment including the compensation apparatus according to any of the above (1) to (6).

Details of Embodiment

Hereinafter, a preferred embodiment of the present invention will be described with reference to the drawings.

[1. Configuration of Communication Equipment]

FIG. 1 shows a configuration of a receiver in wireless communication equipment having transmitting and receiving functions. The wireless communication equipment is used as wireless base station equipment or wireless terminal equipment. The configuration shown in FIG. 1 may be used not only as a receiver but also as a monitor device that receives a transmission signal transmitted by itself, in order to monitor a transmission signal transmitted from a transmitter in its wireless communication equipment (e.g., monitoring for DPD (Digital Pre-Distortion) of a transmission amplifier).

The receiver 1 shown in FIG. 1 has a function to quadrature-demodulate a reception signal. Further, the receiver 1 also has a function as a compensation apparatus that compensates for quadrature demodulation distortion that occurs when quadrature demodulation is performed.

The receiver 1 includes: an amplifier (low-noise amplifier) 2 that amplifies a reception signal received by an antenna (not shown); a variable attenuator 3 that performs gain control for the reception signal; and a quadrature demodulator 5 that performs quadrature demodulation of the reception signal.

The receiver 1 further includes: amplifiers 51*a* and 51*b* that amplify quadrature-demodulated signals (I and Q signals) output from the quadrature demodulator 5, respectively; filters (low-pass filters) 53*a* and 53*b* that perform filtering for the I and Q signals, respectively; and ADCs 6*a* and 6*b* that convert the analog I and Q signals into digital signals, respectively.

The receiver 1 further includes: a quadrature demodulation compensation section 7 that compensates for the quadrature-demodulated signals (I and Q signals); and a gain compensation section 8 that compensates for the gains of the quadrature-demodulated signals (I and Q signals).

The quadrature demodulation compensation section 7 and the gain compensation section 8 are configured to perform a compensation process by digital signal processing. The quadrature demodulation compensation section 7 receives the I and Q signals converted into the digital signals by the ADCs 6a and 6b, and performs the compensation process on the I and Q signals.

The quadrature demodulator 5 includes analog components, such as an oscillator 5a, a π/2 phase shifter 5b, and multipliers 5c and 5d, for generating a signal of a reception carrier frequency (a signal of a frequency that matches the reception carrier frequency). The quadrature demodulator 5 is an analog quadrature demodulator (AQD) that performs a quadrature demodulation process by analog signal processing. The quadrature-demodulated signals (I and Q signals) obtained by quadrature-demodulating the reception signal are distorted due to variation in the analog components constituting the quadrature demodulator 5.

The causes of such distortion are as follows:

1) leakage (feed through) of a carrier frequency injected from the oscillator 5a;

2) deviation of quadrature caused by variation in manufacture of the π/2 phase shifter 5b;

3) gain imbalance that occurs in two paths from the quadrature demodulator 5 to the ADCs 6a and 6b; and 4) DC offset.

The quadrature demodulation compensation section 7 has a quadrature demodulator correction function, and compensates for distortion that occurs in the quadrature-demodulated signals (I and Q signals) due to the quadrature demodulator 5 or the like.

Figure 2:
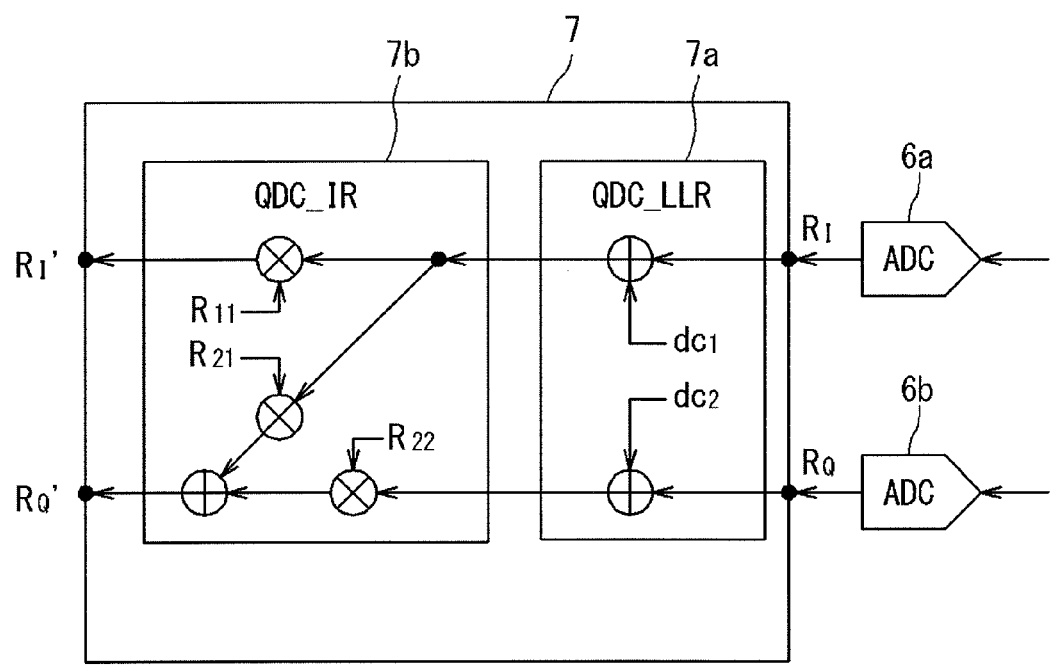
FIG. 2 is a block diagram showing a quadrature demodulation compensation section.

FIG. 2 shows the quadrature demodulation compensation section 7 including only a local leakage rejection section 7a and an image component rejection section 7b.

The local leakage rejection section (QDC_LLR; Quadrature Demodulator Correction_Local Leakage Rejection) 7a removes local leakage among the quadrature demodulation distortions. The local leakage is caused by leakage of the carrier frequency and/or DC offset.

The image component rejection section (QDC_IR; Quadrature Demodulator Correction_Image Rejection) 7b removes an image component among the quadrature demodulation distortions. The image component is caused by quadrature deviation and/or gain imbalance.

The local leakage can be observed regardless of presence/absence of a signal. As for the image component, how the distortion occurs varies depending on signals.

The local leakage rejection section 7a and the image component rejection section 7b each perform distortion compensation, based on compensation parameters (compensation coefficients) $R_{11}$, $R_{21}$, $R_{22}$, $d_{c1}$, and $d_{c2}$ for compensating for the quadrature demodulation distortion (local leakage or image component). The compensation parameters are calculated by a control section 9.

The compensation process performed by the quadrature demodulation compensation section 7 shown in FIG. 2 can be expressed by the following Equation 1 based on the above compensation parameters:

[Equation 1]

$$\begin{pmatrix} R'_I(t) \\ R'_Q(t) \end{pmatrix} = \begin{pmatrix} R_{11} & 0 \\ R_{21} & R_{22} \end{pmatrix} \begin{pmatrix} R_I(t) \\ R_Q(t) \end{pmatrix} + \begin{pmatrix} dc_1 \\ dc_2 \end{pmatrix} \quad (1)$$

In the equation 1, $d_{c1}$ and $d_{c2}$ are first compensation parameters for removing the local leakage, and $R_{11}$, $R_{21}$, and $R_{22}$ are second compensation parameters for removing the image component.

The compensation parameters $R_{11}$, $R_{21}$, $R_{22}$, $d_{c1}$, and $d_{c2}$ are calculated by the control section 9.

The inventor of the present invention has found that there are cases where the image component cannot be sufficiently suppressed even if the quadrature demodulation compensation section 7 shown in FIG. 2 is used. So, the inventor of the present invention made a hypothesis that insufficient suppression of the image component is caused by the LPFs 53a and 53b, and verified the hypothesis.

The frequency characteristic of an analog filter varies depending on variation in constants of elements (inductor, capacitor, etc.) constituting the filter, or variation in mounting at the time of circuit manufacture. The variation in the frequency characteristic of the filter causes variation in group delay of the filter.

The inventor of the present invention considered that a characteristic difference between the frequency characteristic of the first LPF (first filter) 53a that performs filtering of the I signal and the frequency characteristic of the second LPF (second filter) 53b that performs filtering of the Q signal might cause insufficient suppression of the image component.

Therefore, the inventor of the present invention performed a simulation to verify whether the difference in frequency characteristic between the analog filters (LPFs) 53a and 53b causes insufficient suppression of the image component.

Figure 3:
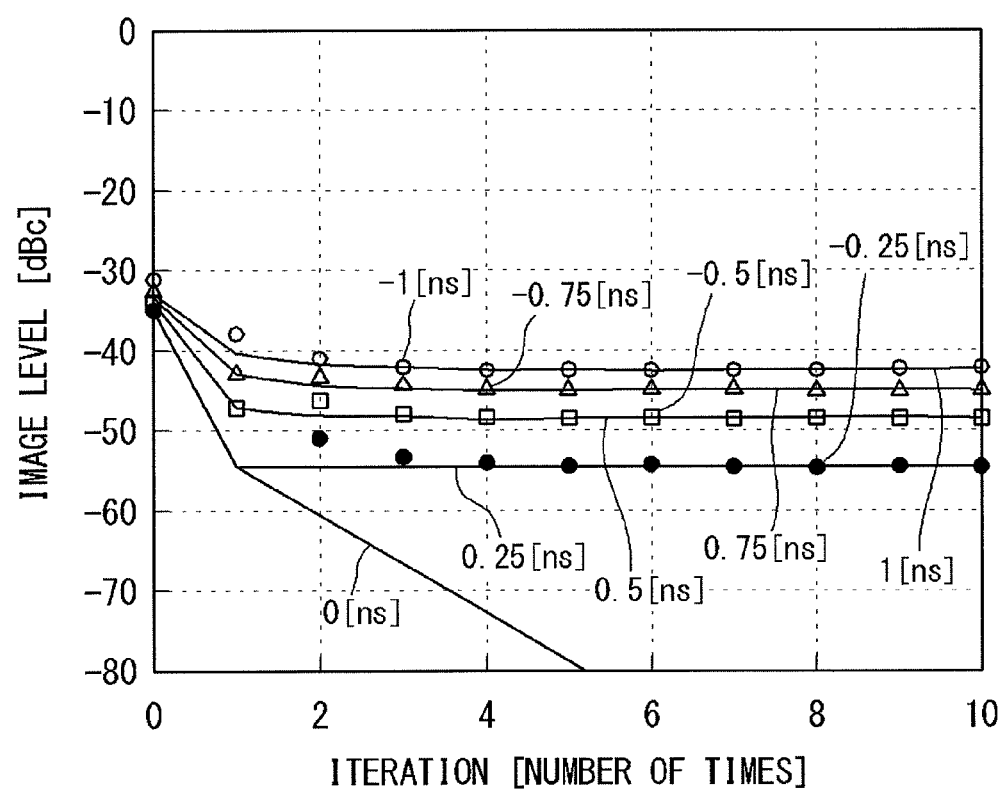
FIG. 3 is an evaluation graph of image suppression performance of the quadrature demodulation compensation section shown in FIG. 2.

FIG. 3 shows the result of the simulation. In this simulation, image component suppression performance of the quadrature demodulation compensation section 7 is evaluated in the case where a difference in frequency characteristic between the LPFs 53a and 53b causes a difference in group delay (group delay difference) between the LPFs 53a and 53b.

In FIG. 3, the vertical axis indicates the image level [dBc], and the horizontal axis indicates the number of iterations of an algorithm (QDC algorithm) for calculating the compensation parameters $R_{11}$, $R_{21}$, $R_{22}$, $d_{c1}$, and $d_{c2}$.

In this simulation, the image component suppression performance is evaluated in the cases where the group delay differences between the LPFs 53a and 53b are −1 [ns], −0.75 [ns], −0.5 [ns], −0.25 [ns], 0 [ns], 0.25 [ns], 0.5 [ns], 0.75 [ns], and 1 [ns]. The group delay difference being minus means that the I signal precedes the Q signal, and the group delay difference being plus means that the Q signal precedes the I signal. In addition, 0 [ns] means that there is no group delay difference.

As shown in FIG. 3, by repeatedly executing the algorithm, the image level is reduced. When there is no group delay difference, the more the algorithm is repeated, the more the image level is reduced. However, when there is a group delay difference, the image suppression level is bottomed in spite of the algorithm being repeatedly executed.

The relationship between the group delay and the phase difference between the I and Q signals, around ±10 kHz, is as follows:

group delay difference=0.00 [ns]: phase difference=±0.0 [degree]

group delay difference=0.25 [ns]: phase difference=±0.9 [degree]

group delay difference=0.50 [ns]: phase difference=±1.8 [degree]

group delay difference=0.75 [ns]: phase difference=±2.7 [degree]

group delay difference=1.00 [ns]: phase difference=±3.6 [degree]

It is found from FIG. 3 that even a small phase difference causes prevention of image suppression.

Figure 4:
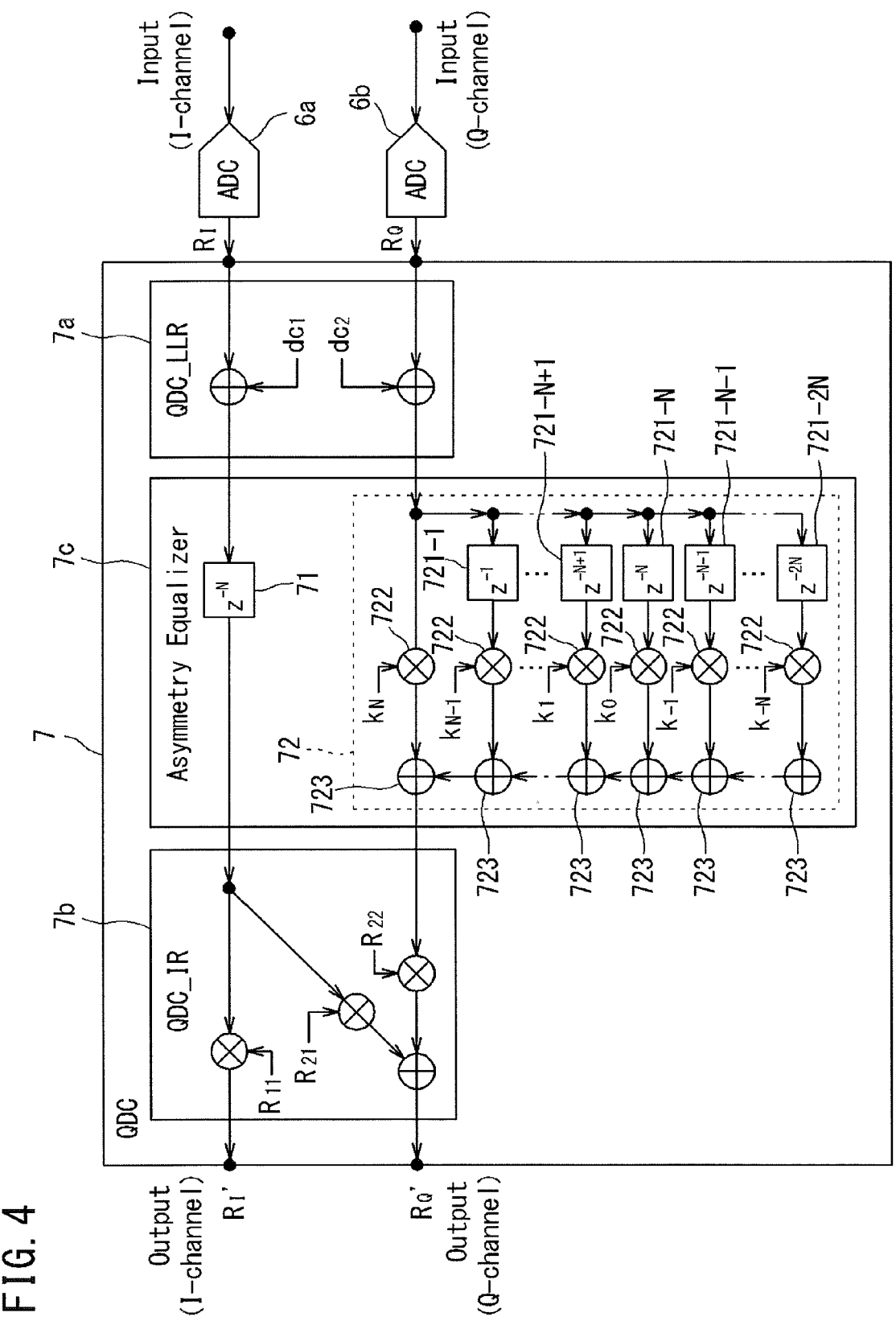
FIG. 4 is a block diagram showing a quadrature demodulation compensation section according to an embodiment.

Therefore, as shown in FIG. 4, the quadrature demodulation compensation section 7 according to the present embodiment is provided with, in addition to the local leakage rejection section 7a and the image component rejection section 7b also shown in FIG. 2, an asymmetry equalizer 7c for eliminating the difference in frequency characteristic between the LPFs 53a and 53b.

The asymmetry equalizer 7c compensates for the difference in frequency characteristic between the LPFs 53a and 53b to remove the image component, in combination with the image component rejection section 7b.

The configuration of the quadrature demodulation compensation section 7 shown in FIG. 2 can compensate for deviation from ideal characteristics, which is caused in the quadrature demodulator 5, the amplifiers 51a and 51b, and the ADCs 6a and 6b, but cannot prevent the LPFs 53a and 53b from inhibiting suppression of the image component. However, the quadrature demodulation compensation section 7 shown in FIG. 4 can prevent the LPFs 53a and 53b from inhibiting suppression of the image component, and therefore, can remove the image component more effectively as compared to the quadrature demodulation compensation section 7 shown in FIG. 2.

The asymmetry equalizer 7c shown in FIG. 4 is configured as a delay section (equalizer for delay compensation) that performs delay processing for the quadrature-demodulated signal (I signal/Q signal).

The delay section 7c suppresses a group delay difference between a group delay caused by the first LPF 53a and a group delay caused by the second LPF 53b, thereby to resolve the difference in frequency characteristic between the filters 53a and 53b.

The delay section 7c includes a first delay processing section 71 that performs delay processing for the I signal, and a second delay processing section 72 that performs delay processing for the Q signal.

The first delay processing section 71 is configured to include an N delayer ($Z^{-N}$), and perform delay processing to cause the I signal to have an N delay (a delay N times as large as a unit delay $Z^{-1}$; a predetermined delay amount).

The second delay processing section 72 is configured as an FIR filter. The second delay processing section 72 configured as an FIR filter can make the frequency characteristic in a Q channel in which the Q signal is processed, equal to the frequency characteristic in an I channel in which the I signal is processed. Thereby, the amount of image suppression is improved.

The second delay processing section 72 may be configured as an IIR filter.

The FIR filter type second delay processing section 72 has an order of 2N (number of taps=2N+1), and includes 2N delayers 721-1 to 721-2N ranging from $Z^{-1}$ to $Z^{-2N}$, 2N+1 multipliers 722, and 2N+1 adders 723.

2N+1 parameters $k_N, k_{N-1}, \ldots, k_1, k_0, k_{-1}, \ldots, k_{-N}$ to be multiplied in the 2N+1 multipliers 722 are compensation parameters (third compensation parameters) for removing the difference in frequency characteristic between the filters 53a and 53b. These compensation parameters $k_N, k_{N-1}, \ldots, k_1, k_0, k_{-1}, \ldots, k_{-N}$ are calculated by the control section 9.

The compensation process performed by the quadrature demodulation compensation section 7 shown in FIG. 4 is expressed by Equation 2 shown in FIG. 21(a), based on the first to third compensation parameters.

In Equation 2, *(n·T) indicates, when the sampling interval is T (sec), an analog signal at time n×T.

The purpose of setting the order of the second delay processing section 72 to 2N is to make the second delay processing section 72 able to cope with both the case where the Q signal precedes and the case where the Q signal delays, on the basis of the delay amount N (predetermined delay amount) of the first delay processing section 71.

When the delay amount N of the first delay processing section 71 is used as a basis, the $Z^{-0}$ (not shown as a delayer in FIG. 4) and the $Z^{-1}$ to $Z^{-N}$ delayers 721-1 to 721-N can perform a first process that causes (a delay of the delay amount N, and) a delay of a delay amount smaller than the delay amount N, and thus the group delay difference in the case where the Q signal is delayed with respect to the I signal is suppressed.

In addition, when the delay amount N of the first delay processing section 71 is used as a basis, the $Z^{-N}$ to $Z^{-2N}$ delayers 721-N to 721-2N can perform a second process that causes (a delay of the delay amount N and) a delay of a delay amount larger than the delay amount N, and thus the group delay difference in the case where the I signal is delayed with respect to the Q signal is suppressed.

By setting the order of the second delay processing section 72 to 2N, the second delay processing section 72 can cope with the situation where it is unknown which of the I signal and the Q signal is delayed.

The first delay processing section 71 may be provided in the Q channel, and the second delay processing section 72 may be provided in the I channel.

When it is known which of the I signal and the Q signal is delayed, the first delay processing section 71 may be omitted, and the second delay processing section 72 may be provided in the channel for the delayed signal, with the order of the second delay processing section 72 being set to N.

Figure 5:
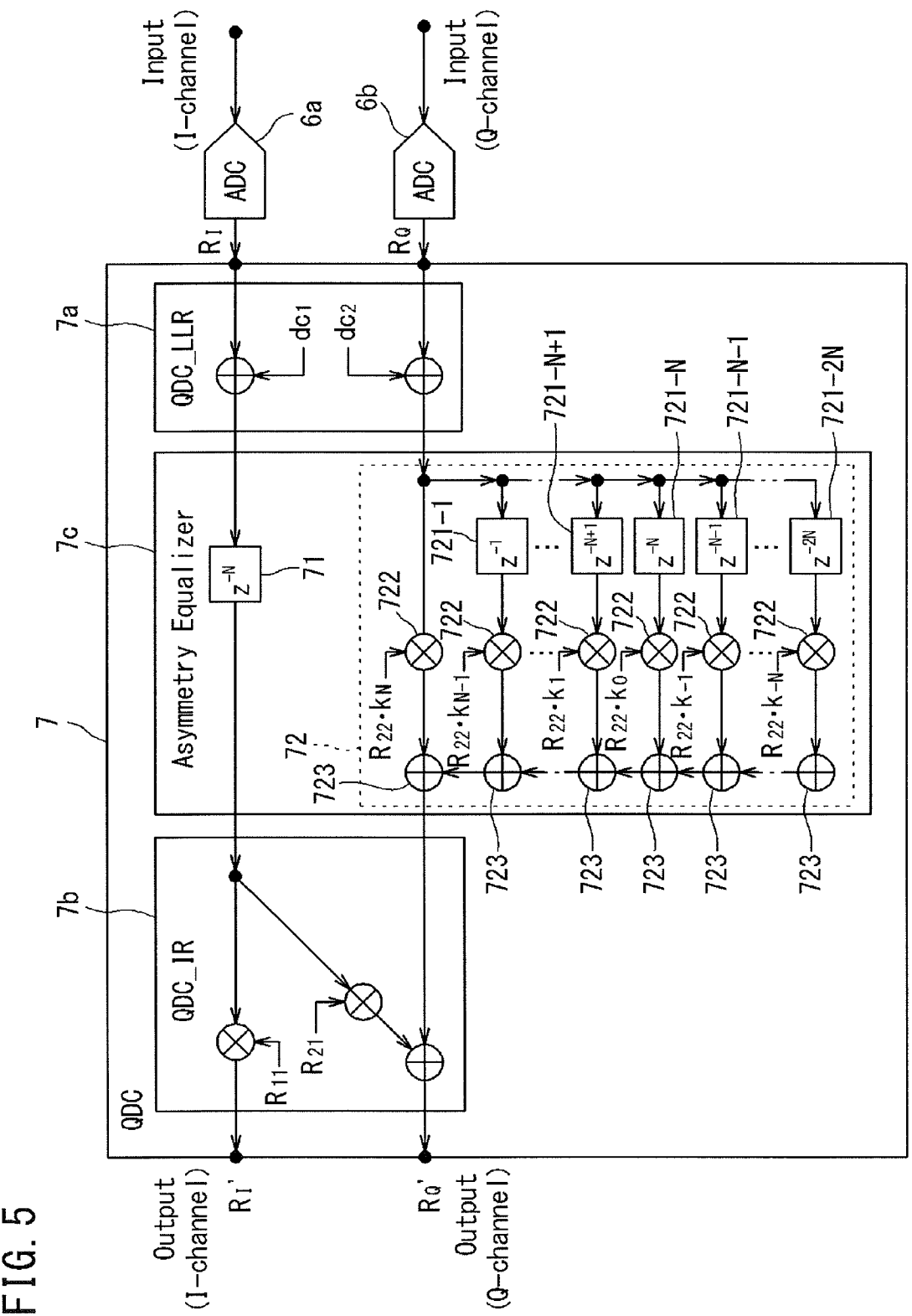
FIG. 5 is a block diagram showing a modification of the quadrature demodulation compensation section according to the embodiment.

FIG. 5 shows a modification of the quadrature demodulation compensation section 7 shown in FIG. 4. In the quadrature demodulation compensation section 7 shown in FIG. 5, the multiplier for multiplying the compensation parameter $R_{22}$ is omitted in the image component rejection section 7b. Instead, in the quadrature demodulation compensation section 7 shown in FIG. 5, in each of the 2N+1 multipliers 722 in the second delay processing section 72, the compensation parameter $R_{22}$ is multiplied together with the 2N+1 parameters $k_N, k_{N-1}, \ldots, k_1, k_0, k_{-1}, \ldots, k_{-N}$.

The quadrature demodulation compensation section 7 shown in FIG. 5 can perform the same compensation process as that shown in FIG. 4, and moreover, one of the multipliers in the image component rejection section 7b can be omitted, and thus simplification of the circuit is achieved.

Figure 6:
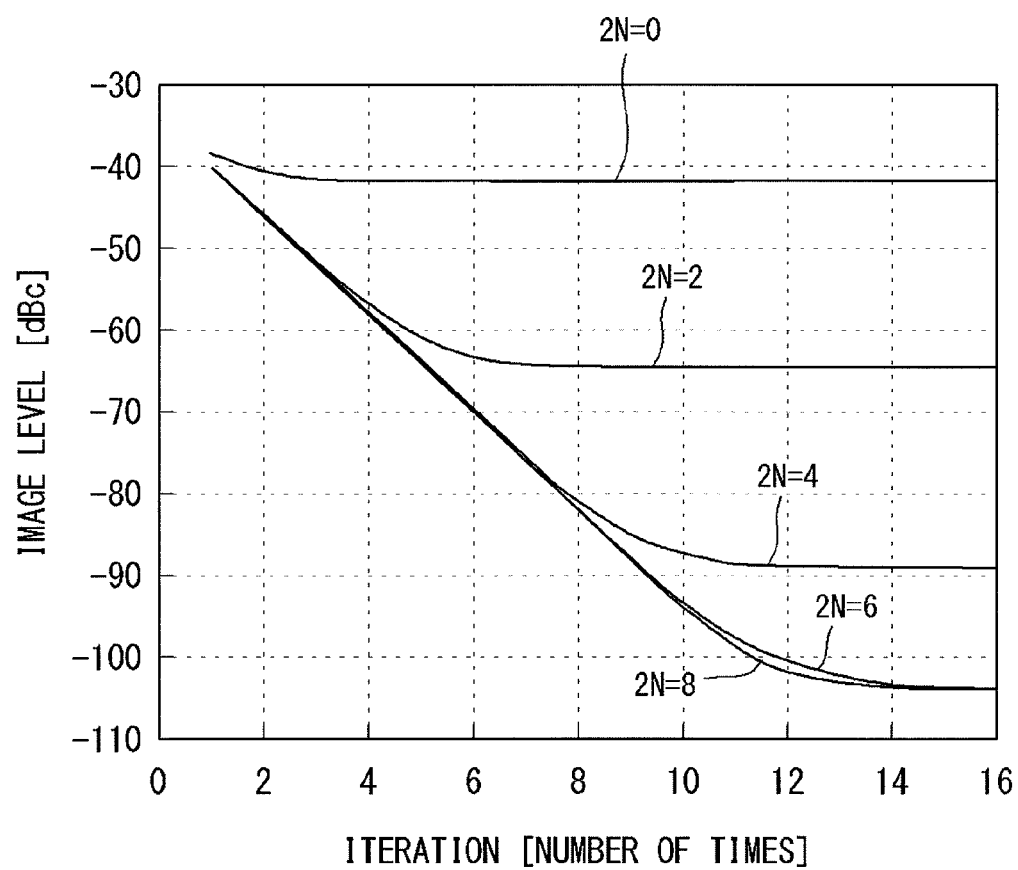
FIG. 6 is an evaluation graph of image suppression performance of the quadrature demodulation compensation section shown in FIG. 4.

FIG. 6 shows the result of evaluation (simulation) for image suppression performance in the case where 1 [ns] is assumed as a group delay difference between the LPFs 53a and 53b.

In this simulation, the image suppression performance is evaluated in the cases where the order 2N of the second delay processing section 72 is 0, 2, 4, 6, and 8.

As shown in FIG. 6, the larger the order of the second delay processing section 72 is, the more the image suppression performance is improved. However, in the result shown in FIG. 6, when the group delay difference is about 1 [ns], the image suppression performance is saturated when the order is set to about 6.

Figure 7:
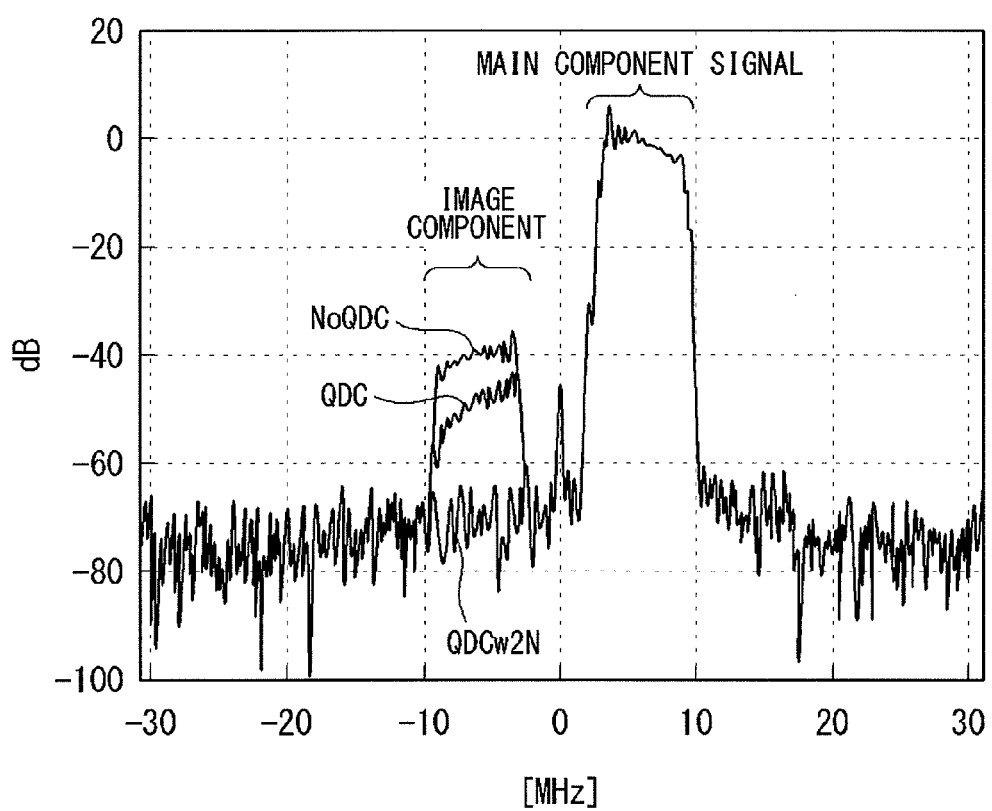
FIG. 7 shows a frequency spectrum representing a result of a simulation performed by the quadrature demodulation compensation section shown in FIG. 4.

FIG. 7 shows the result of simulation using an actual reception signal. The simulation result shown in FIG. 7 shows a frequency spectrum in the case where compensation by the quadrature demodulation compensation section 7 is not performed (NoQDC in FIG. 7), a frequency spectrum in the case where compensation is performed by the quadrature demodulation compensation section 7 shown in FIG. 2 (QDC in FIG. 7), and a frequency spectrum in the case where compensation is performed by the quadrature demodulation compensation section 7 (the order 2N of the second delay processing section 72=8) shown in FIG. 4 (QDCw2N-AE in FIG. 7). In this simulation, removal of local leakage is not performed.

As shown in FIG. 7, when compensation is performed by the quadrature demodulation compensation section 7 shown in FIG. 2, the image component can be suppressed as compared to the image component (image level=−39.673 [dBc]) in the case where no compensation is performed. Specifically, the image level is lowered to −47.117 [dBc].

When compensation is performed by the quadrature demodulation compensation section 7 shown in FIG. 4, the image component can be further suppressed. Specifically, the image level is lowered to −68.459 [dBc].

Thus, it is found that compensation by the quadrature demodulation compensation section 7 shown in FIG. 4 improves the image suppression performance.

FIG. 8 also shows the result of simulation in which the image level suppression performance is verified.

In this simulation, as the LPFs 53a and 53b in the circuit shown in FIG. 1, a plurality of LPFs (LPF-A, LPF-B, and LPF-C) of different conditions are used. In addition, four circuits (No. 1 to No. 4) are produced for each LPF of the same condition. In other words, four circuits (No. 1 to No. 4) are produced for the LPF-A of a certain condition, four circuits (No. 1 to No. 4) are produced for the LPF-B of another condition, and four circuits (No. 1 to No. 4) are produced for the LPF-C of still another condition.

In FIG. 8, "BEFORE COMPENSATION" indicates image levels in the case where compensation by the quadrature demodulation compensation section 7 shown in FIG. 4 is not performed. It is found that, not only in the LPFs of different conditions but also in the LPFs of the same condition, the circuit characteristics of the LPFs are subtly changed due to variations of elements constituting the LPFs, resulting in different image levels of the LPFs.

FIG. 8 shows, for each of the circuits No. 1 to No. 4 of each of the LPFs (LPF-A, LPF-B, and LPF-C), the result of simulation in which the order 2N of the second delay processing section 72 is set to 0, 2, 4, 6, and 8.

As is apparent from FIG. 8, when the order 2N of the second delay processing section 72 is 4 or higher, the image component can be suppressed to −65 [dBc].

The order of the second delay processing section 72 is preferably 2N or lower when the orders of the first filter 53a and the second filter 53b are N.

When the orders of the first filter 53a and the second filter 53b are N, the second delay processing section 72 configured as an FIR filter having an order of N at most suffices to suppress the difference in frequency characteristic between the filters 53a and 53b. The second delay processing section 72 of the present embodiment is configured as a filter having an order twice the order N required for suppressing the frequency characteristic difference, in order to cope with the situation where it is unknown which of the I signal and the Q signal is delayed.

Thus, the order of the second delay processing section 72 may be 2N or lower when the orders of the first filter 53a and the second filter 53b are N.

Referring back to FIG. 1, when calculating the compensation parameters $R_{11}$, $R_{21}$, $R_{22}$, $k_N$, $k_{N-1}$, ..., $k_1$, $k_0$, $k_{-1}$, ..., $k_{-N}$, $d_{c1}$, $d_{c2}$, the control section 9 uses not a usual reception signal received by an antenna but a special signal (reference signal) having a predetermined bandwidth. The reference signal used for calculating the compensation parameters is generated by a signal generator 10.

That is, the signal generator 10 that generates the reference signal, the control section 9 that calculates the compensation parameters $R_{11}$, $R_{21}$, $R_{22}$, $k_N$, $k_{N-1}$, ..., $k_1$, $k_0$, $k_{-1}$, ..., $k_{-N}$ used for removing the image component based on the quadrature-demodulated signal obtained by quadrature-demodulating the reference signal, and the quadrature demodulation compensation section 7 that removes the image component among the quadrature demodulation distortions by using the compensation parameters $R_{11}$, $R_{21}$, $R_{22}$, $k_N$, $k_{N-1}$, ..., $k_1$, $k_0$, $k_{-1}$, ..., $k_{-N}$, constitute a compensation apparatus that performs the compensation process of removing the image component caused by the quadrature demodulator 5.

Although, as shown in FIG. 4, the quadrature demodulation compensation section 7 includes the local leakage rejection section 7a, the image component rejection section 7b, and the asymmetry equalizer (delay section) 7c, the local leakage rejection section 7a may be omitted if the compensation apparatus is used only for removing the image component caused by the quadrature demodulator 5.

[2. Signal Generator]

Figure 9:
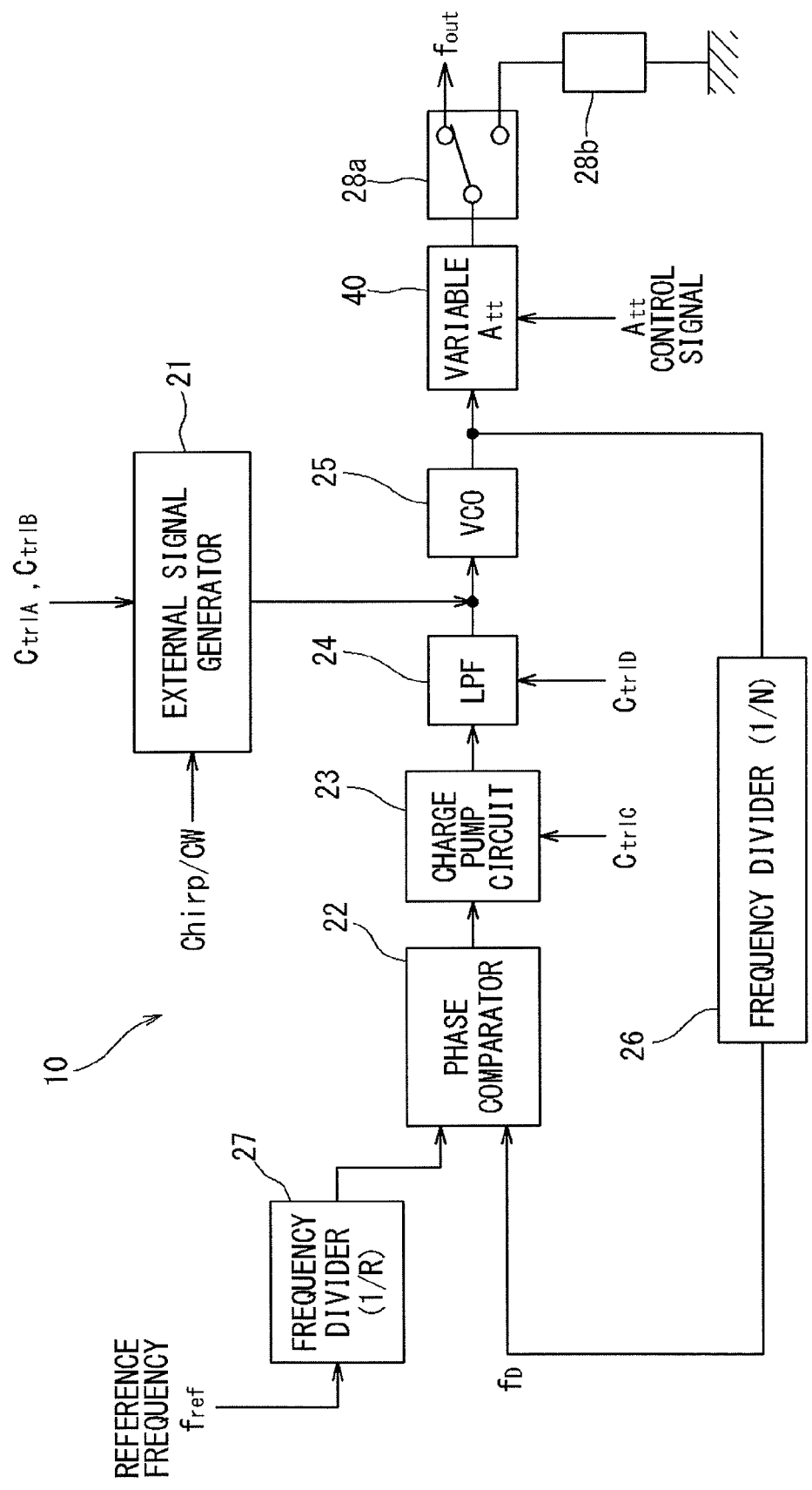
FIG. 9 is a circuit diagram of a signal generator.

FIG. 9 shows the circuit configuration of the signal generator 10. The signal generator is obtained by adding an external signal generator (external signal generation section) 21 to a phase lock loop (PLL) oscillation circuit.

The PLL oscillation circuit shown in FIG. 9 includes a phase comparator 22, a charge pump circuit 23, a low-pass filter (loop filter) 24, a voltage-controlled oscillator (VCO) 25, and frequency dividers 26 and 27.

The phase comparator 22 compares an output signal from the frequency divider 27 that performs R frequency division on a reference frequency $f_{ref}$, with an output signal from the frequency divider 26 that performs N frequency division on an output signal (frequency $f_{out}$) from the voltage-controlled oscillator 25, and outputs a voltage according to a phase difference between the output signals. The output voltage from the phase comparator 22 passes through the charge pump circuit 23 and the low-pass filter 24 to become a control signal (control voltage) for the voltage-controlled oscillator 25.

The output signal from the voltage-controlled oscillator 25 is fed back to the phase comparator 22 via the frequency divider 26, and thus a phase lock loop is formed. In a general PLL oscillation circuit, a phase lock loop causes the voltage-controlled oscillator 25 to output a signal of a constant frequency.

Figure 10:
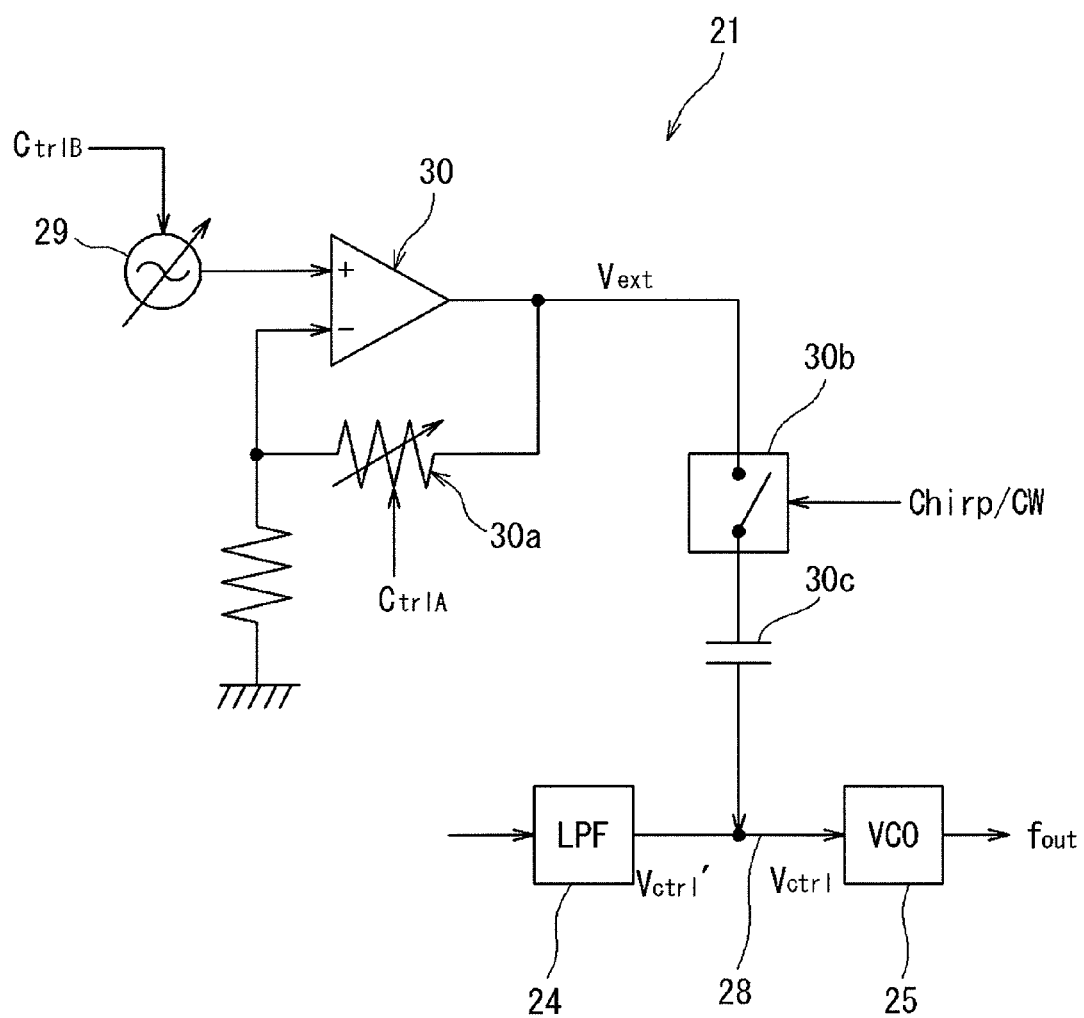
FIG. 10 is a circuit diagram showing an external signal generator and its periphery.

In contrast, the signal generator 10 shown in FIG. 9 is provided with the external signal generator 21. As shown in FIG. 10, the external signal generator 21 includes an oscillator (variable frequency oscillator) 29 that generates a time-varying signal such as a sine wave. A signal (external signal) $V_{ext}$ generated by the oscillator 29 is superposed on the control signal for the voltage-controlled oscillator 25.

That is, a control signal (control voltage) $V_{ctrl}$ is generated, in which the external signal $V_{ext}$ is superposed on an original control signal (original control voltage) $V_{ctrl}'$ generated when the output voltage from the phase comparator 22 has passed through the charge pump circuit 23 and the low-pass filter 24.

In the external signal generator 21 shown in FIG. 10, the output signal from the oscillator 29 is given to an input line 28 of the voltage-controlled oscillator 25 via a non-inverting amplifier 30, a switch section (switch) 30b, and a capacitor 30c.

The non-inverting amplifier 30 has a function of adjusting the amplitude of the external signal generated by the oscillator 29. If the amplitude of the external signal $V_{ext}$ need not be adjusted, the non-inverting amplifier 30 may be configured as a voltage follower circuit.

The switch section 30b has a function of switching ON/OFF of superposition of the external signal $V_{ext}$ on the control signal. When the switch section 30b is turned ON, the external signal generator 21 is set in a first mode where the control voltage $V_{ctrl}$ in which the external signal $V_{ext}$ is superposed on the output voltage of the phase comparator 22 is given to the voltage-controlled oscillator 25. When the switch section 30b is turned OFF, the external signal generator 21 is set in a second mode where the control voltage $V_{ctrl}'$ in which the external signal $V_{ext}$ is not superposed on the output voltage of the phase comparator 22 is given to the voltage-controlled oscillator 25.

The ON/OFF switching of the switch section 30b is performed based on a control signal (Chirp/CW signal) supplied from the control section 9.

It is noted that the capacitor 30c acts as an AC coupling, and has a function of swinging the external signal $V_{ext}$ with the original control signal $V_{ctrl}'$ being a bias voltage.

Regarding the input-output characteristics of the voltage-controlled oscillator (VCO) 25, the output frequency (oscillation frequency) $f_{out}$ monotonically increases with respect to the control signal (control voltage) $V_{ctrl}$. That is, a signal of an output frequency (oscillation frequency) $f_{out}$ according to the magnitude of the control signal $V_{ctrl}$ is output from the voltage-controlled oscillator (VCO) 25.

A variable attenuator 40 is provided on the output side of the VCO 25. The variable attenuator 40 can adjust the output of the VCO 25 for the purpose of, for example, preventing the signal supplied from the signal generator 10 from being saturated when the gain of the receiver is increased. The variable attenuator 40 can be controlled by the control section 9.

Figure 11:
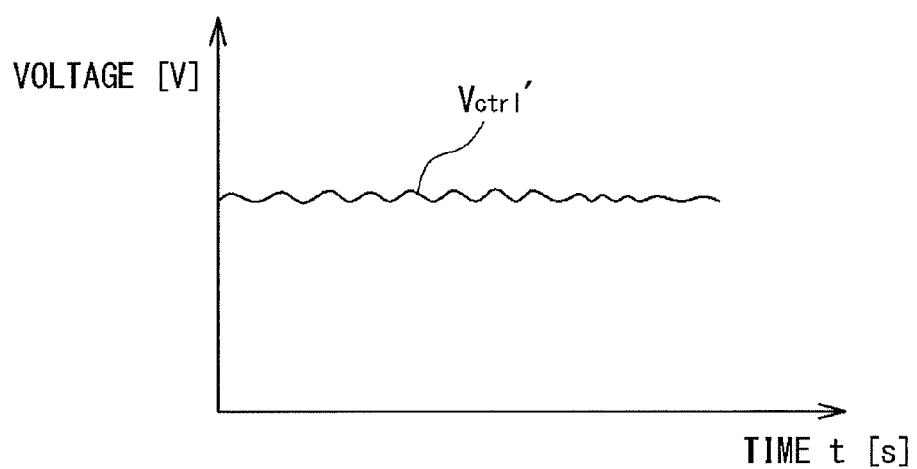
FIG. 11($a$) shows a control signal to a VCO, and FIG. 11($b$) shows an oscillation frequency of the VCO.
Figure 11:
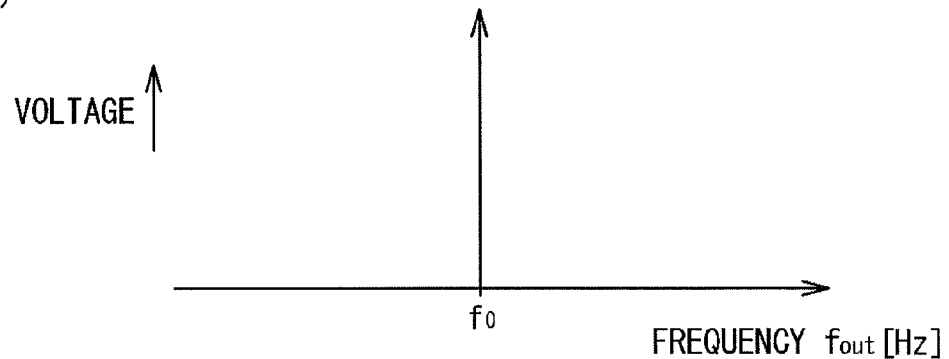

As shown in FIG. 11(a), when only the control signal (control voltage) $V_{ctrl}'$ according to the output voltage of the phase comparator 22, on which the external signal $V_{ext}$ is not superposed, is given to the voltage-controlled oscillator 25, the signal generator 10 acts as a general phase lock loop circuit, and as shown in FIG. 11(b), a signal of a single frequency $f_0$ (non-modulated constant wave) is output from the voltage-controlled oscillator 25.

Figure 12:
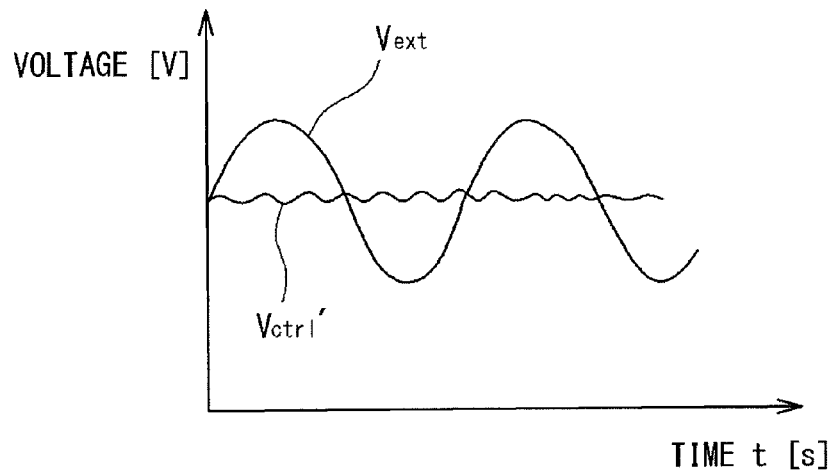
FIG. 12($a$) shows a control signal to a VCO, and FIG. 12($b$) shows an oscillation frequency of the VCO.
Figure 12:
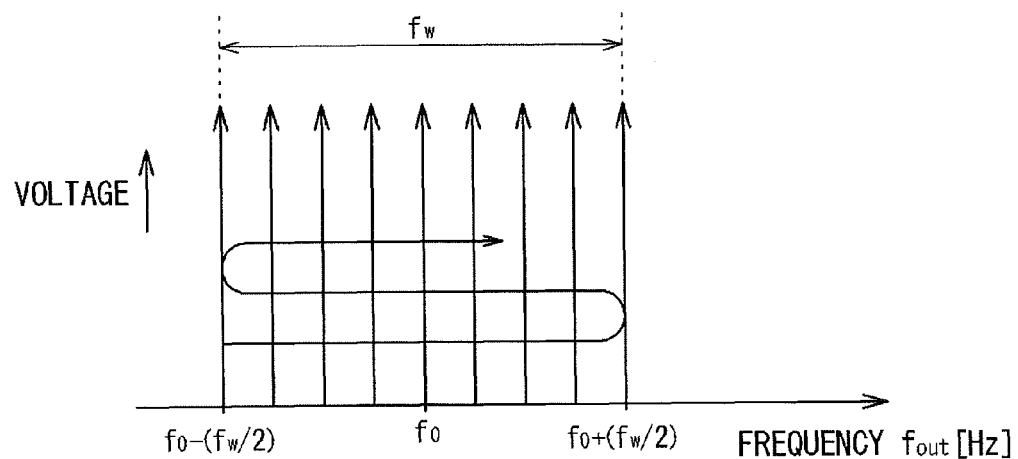

In contrast, when the control signal (control voltage) $V_{ctrl}$ in which the external signal (sine wave) $V_{ext}$ generated by the external signal generator 21 is superposed on the control signal (control voltage) $V_{ctrl}'$ according to the output voltage of the phase comparator 22 as shown in FIG. 12(a) is given to the voltage-controlled oscillator 25, the frequency $f_{out}$ of the output signal from the voltage-controlled oscillator 25 temporally varies around the frequency $f_0$ in accordance with the temporal variation of the amplitude value of the external signal $V_{ext}$, as shown in FIG. 12(b).

That is, when the amplitude value of the external signal $V_{ext}$ is zero, the output frequency of the voltage-controlled oscillator 25 is the frequency $f_0$ that is locked by the control signal (control voltage) $V_{ctrl}'$. However, when the amplitude value of the external signal $V_{ext}$ becomes larger than zero due to the temporal variation of the external signal $V_{ext}$, the output frequency of the voltage-controlled oscillator 25 becomes larger than $f_0$. Conversely, when the amplitude value of the external signal $V_{ext}$ becomes smaller than zero due to the temporal variation of the external signal $V_{ext}$, the output frequency of the voltage-controlled oscillator 25 becomes smaller than $f_0$.

The variation of the output frequency (oscillation frequency) of the voltage-controlled oscillator 25 in accordance with the temporal variation of the external signal $V_{ext}$ occurs between $f_0-(f_w/2)$ and $f_0+(f_w/2)$ around $f_0$. That is, the frequency range in which the output frequency of the voltage-controlled oscillator 25 temporally varies is $f_w$.

The signal generator 10 includes the external signal generator 21, and therefore, can generate a signal whose frequency temporally varies within the predetermined frequency range $f_w$, like a chirp signal.

The signal whose frequency temporally varies within the predetermined frequency range $f_w$, like a chirp signal, can be regarded as a signal whose frequency bandwidth is $f_w$ if time is ignored. Therefore, the signal generator 10 can be regarded as a device that generates a signal (reference signal) of the predetermined bandwidth $f_w$.

Conventionally, in order to generate a chirp signal, a signal generated in a digital form needs to be converted to an analog signal, and the analog signal needs to be modulated, which might cause high cost and large size of the device.

However, in the signal generator 10 shown in FIG. 9, a chirp signal can be easily generated by only adding the external signal generator 21 to a general PLL circuit.

The value of the bandwidth (frequency range) $f_w$ of the signal generated by the signal generator 10 is determined mainly based on the amplitude of the external signal $V_{ext}$. The non-inverting amplifier 30 can be used as a first adjustment section that adjusts the value of the bandwidth (frequency range) $f_w$ by adjusting the amplitude of the external signal $V_{ext}$. The amplification factor of the non-inverting amplifier 30 can be changed by adjusting the value of a variable resistor 30a of the non-inverting amplifier, and as a result, the amplitude of the external signal $V_{ext}$ can be adjusted. A signal $Ctrl_A$ for changing the amplification factor of the non-inverting amplifier 30 is supplied from the control section 9.

The value of the bandwidth (frequency range) $f_w$ of the signal generated by the signal generator 10 is also influenced by other factors than the amplitude of the external signal $V_{ext}$. The other factors include, for example, a ratio between the phase comparison frequency $f_{ref}$ in the phase comparator 22 and the frequency of the external signal $V_{ext}$. If the phase comparison frequency $f_{ref}$ in the phase comparator 22 is high, the phase comparator 22 frequently performs phase comparison, and thereby the degree at which the frequency varied due to the external signal $V_{ext}$ attempts to return to $f_0$ is increased. Therefore, the higher the phase comparison frequency $f_{ref}$ in the phase comparator is, the smaller the bandwidth (frequency range) $f_w$ of the signal generated by the signal generator 10 can be.

The variable frequency oscillator 29 can be used as a second adjustment section that adjusts the ratio between the phase comparison frequency $f_{ref}$ in the phase comparator 22 and the frequency of the external signal $V_{ext}$. By adjusting the frequency of the external signal $V_{ext}$, the ratio between the phase comparison frequency $f_{ref}$ and the frequency of the external signal $V_{ext}$ is adjusted, and as a result, the amplitude of the external signal $V_{ext}$ can be adjusted. A signal $Ctrl_B$ for changing the oscillation frequency of the variable frequency oscillator 29 is supplied from the control section 9.

In order to cause the circuit shown in FIG. 9 to act as a phase lock loop, the frequency of the external signal $V_{ext}$ should be small. If the frequency of the external signal $V_{ext}$ is excessively large, the frequency that varies with the external signal $V_{ext}$ cannot be appropriately controlled. In this regard, for example, the frequency of the external signal $V_{ext}$ is preferably smaller than the phase comparison frequency $f_{ref}$ in the phase comparator 22, and more preferably, is equal to or smaller than 1/10 of the phase comparison frequency $f_{ref}$ in the phase comparator 22.

The other factors that influence the value of the bandwidth (frequency range) $f_w$ of the signal generated by the signal generator 10 may include a charge pump current of the charge pump circuit 23. When the charge pump current increases, the responsiveness of the control voltage $V_{ctrl}'$ to the change of the output voltage of the phase comparator 22 is improved. Therefore, the response speed at which the frequency varied due to the external signal $V_{ext}$ attempts to return to $f_0$ is increased. Therefore, the larger the charge pump current is, the smaller the bandwidth (frequency range) $f_w$ of the signal generated by the signal generator 10 can be.

In order to adjust the charge pump current, a resistor that influences the magnitude of the charge pump current in the charge pump circuit 23 should be made variable. The variable resistor acts as a third adjustment section that adjusts the charge pump current. A signal $Ctrl_C$ for changing the charge pump current is supplied from the control section 9.

The other factors that influence the value of the bandwidth (frequency range) $f_w$ of the signal generated by the signal generator 10 may include the time constant of the LPF 24. Even when the charge pump current is constant, if the responsiveness of the LPF 24 itself is improved, the responsiveness of the output voltage (control voltage $V_{ctrl}'$) of the LPF 24 is improved. Thereby, the response speed at which the frequency varied due to the external signal $V_{ext}$ attempts to return to $f_0$ is increased. Therefore, the smaller the time constant is set in order to improve the responsiveness of the LPF 24, the smaller the bandwidth (frequency range) $f_w$ of the signal generated by the signal generator 10 can be.

In order to adjust the time constant of the LPF 24, an element that influences the time constant in the LPF 24 should be made variable. This variable element serves as a fourth adjustment section that adjusts the time constant of the LPF 24.

A signal generated from the signal generator 10 configured as described above is given to the amplifier 2 via a switch section 11, and quadrature-demodulated by the quadrature demodulator 5. The switch section 11 can select, as a signal to be given to the amplifier 2 (quadrature demodulator 5), either the reception signal received by the antenna (not shown) or the signal generated by the signal generator 10. A switching control signal is supplied from the control section 9 to the switch section 11.

[3. Processing of Control Section]

Figure 13:
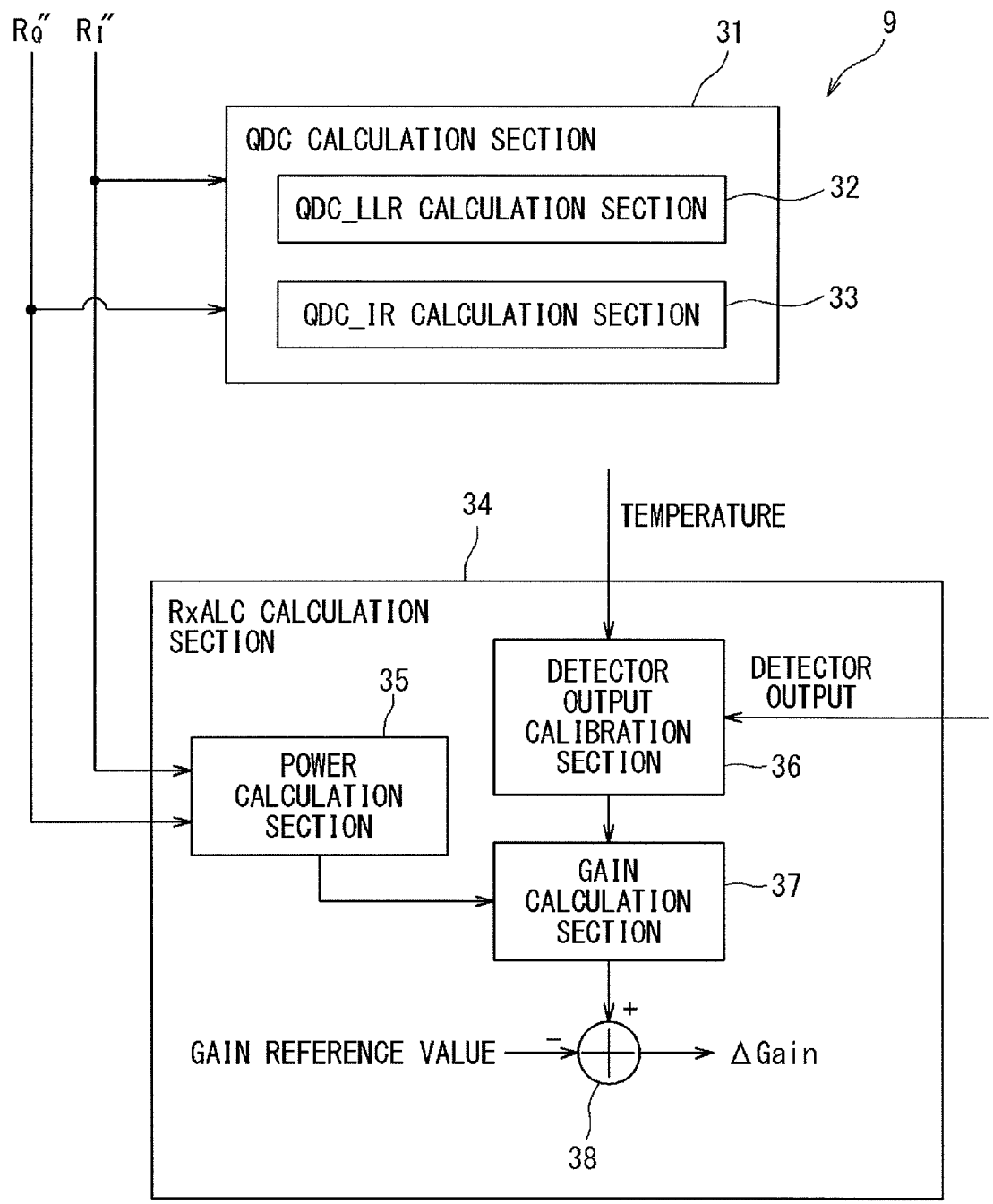
FIG. 13 is a block diagram showing a control section.

As shown in FIG. 13, the control section 9 includes a QDC calculation section (quadrature demodulation compensation calculation section) 31 that calculates compensation parameters used for quadrature demodulation compensation, and an RxALC calculation section (gain compensation calculation section) 34 that calculates compensation values to be referred to by the variable attenuator 3 and/or the gain compensation section 8 for gain compensation.

[3.1 Quadrature Demodulation Compensation]

The QDC calculation section 31 acquires (from the output side of the gain compensation section 8) a quadrature-demodulated signal (I/Q signal) output from the quadrature demodulator 5. Based on the acquired quadrature-demodulated signal, the QDC calculation section 31 calculates a compensation parameter for compensating for quadrature demodulation distortion. The calculated compensation parameter is applied to the quadrature demodulation compensation section 7. Using the compensation parameter, the quadrature demodulation compensation section 7 eliminates quadrature demodulation distortion of the quadrature-demodulated signal (I/Q signal).

The QDC calculation section 31 includes a QDC_LLR calculation section (local leakage calculation section) 32, and a QDC_IR calculation section (image component calculation section) 33.

The QDC_LLR calculation section (local leakage calculation section) 32 is a calculation section that calculates the first compensation parameters $d_{c1}$ and $d_{c2}$ for removing the local leakage.

The QDC_IR calculation section (image component calculation section) 33 is a calculation section that calculates the second compensation parameters $R_{11}$, $R_{21}$, and $R_{22}$ for removing the image component, and the third compensation parameters $k_N, k_{N-1}, \ldots, k_1, k_0, k_{-1}, \ldots, k_{-N}$ for compensating for the frequency characteristic difference between the filters 53a and 53b.

The first compensation parameters $d_{c1}$ and $d_{c2}$ calculated by the QDC_LLR calculation section 32 are applied to the local leakage rejection section 7a. The second compensation parameters $R_{11}$, $R_{21}$, and $R_{22}$ calculated by the QDC_IR calculation section 33 are applied to the image component rejection section 7b. In addition, the third compensation parameters $k_N, k_{N-1}, \ldots, k_1, k_0, k_{-1}, \ldots, k_{-N}$ calculated by the QDC_IR calculation section 33 are applied to the asymmetry equalizer (delay section) 7c.

In the case of the quadrature demodulation compensation section 7 shown in FIG. 5, the second compensation parameter $R_{22}$ calculated by the QDC_IR calculation section 33 is applied to the asymmetry equalizer (delay section) 7c.

If the control section 9 includes at least the QDC_IR calculation section 33 that calculates the second compensation parameters $R_{11}$, $R_{21}$, and $R_{22}$ for removing the image component and the third compensation parameters $k_N, k_{N-1}, \ldots, k_1, k_0, k_{-1}, \ldots, k_{-N}$, the control section 9 can realize a function as a calculation section of the compensation apparatus that performs the compensation process of removing the image component caused by the quadrature demodulator 5.

Figure 14:
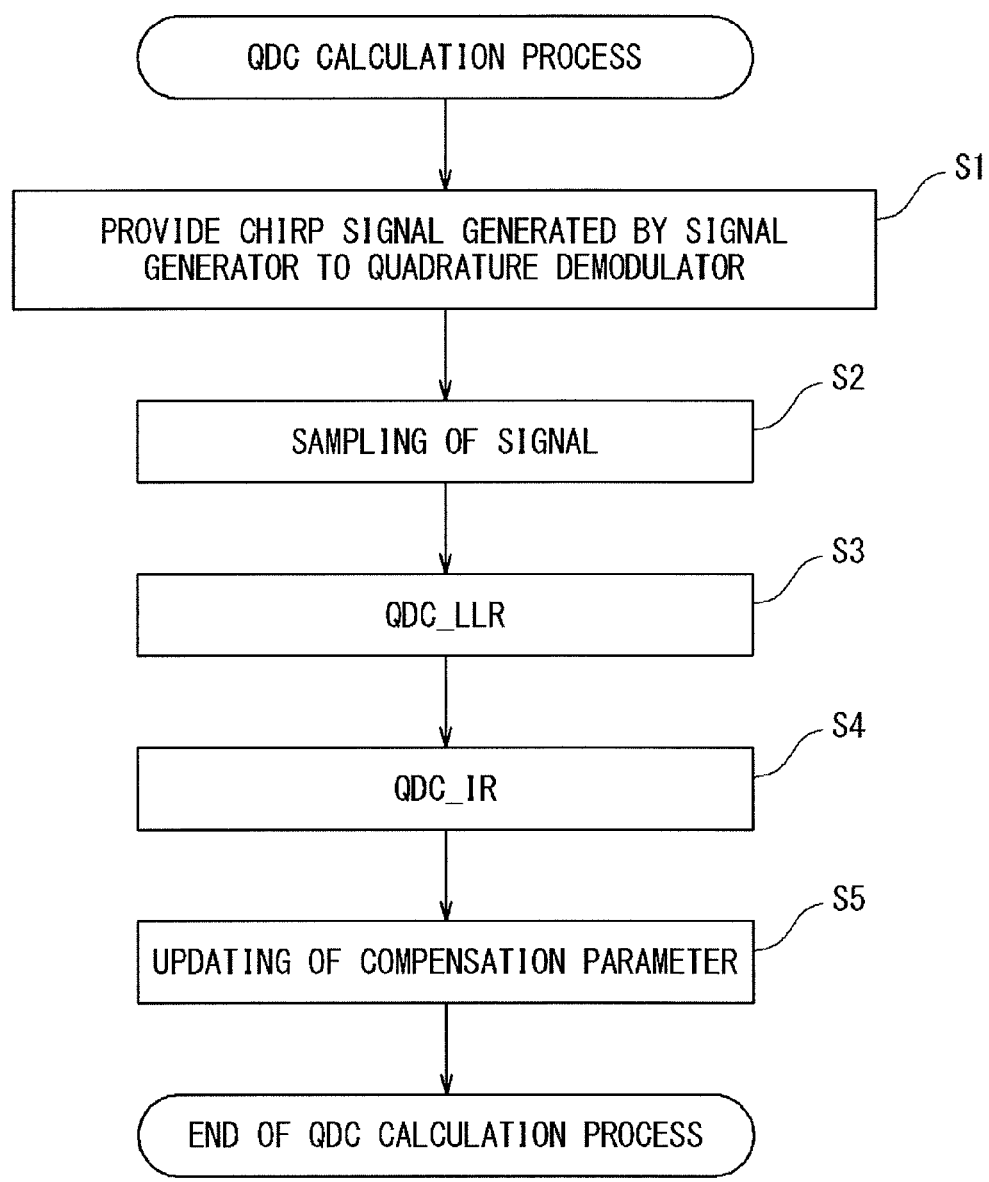
FIG. 14 is a flowchart of a QDC calculation process.

FIG. 14 shows a processing flowchart for calculating (updating) the compensation parameters. First, the control section 9 gives a chirp signal generated by the signal generator 10 to the input side of the quadrature demodulator 5 (step S1).

If the receiver 1 is provided with a plurality of systems (the circuit shown in FIG. 1) each processing a reception signal, selection of a system to be a target of calculation of compensation parameters should be performed in advance of step S1.

In step S1, the control section 9 outputs, to the switch section 11, a switching control signal that controls the switch section 11 so that the signal generated in the signal generator 10 is given to the amplifier 2 (quadrature demodulator 5) side. In addition, the control section 9 outputs, to the external signal generator 21 of the signal generator 10, a mode switching control signal (Chirp/CW signal) so that the signal generator 10 is set in the first mode in which the signal generator 10 outputs not a single-frequency signal (CW; Constant Wave) but a chirp signal having a predetermined bandwidth $f_w$.

Figure 15:
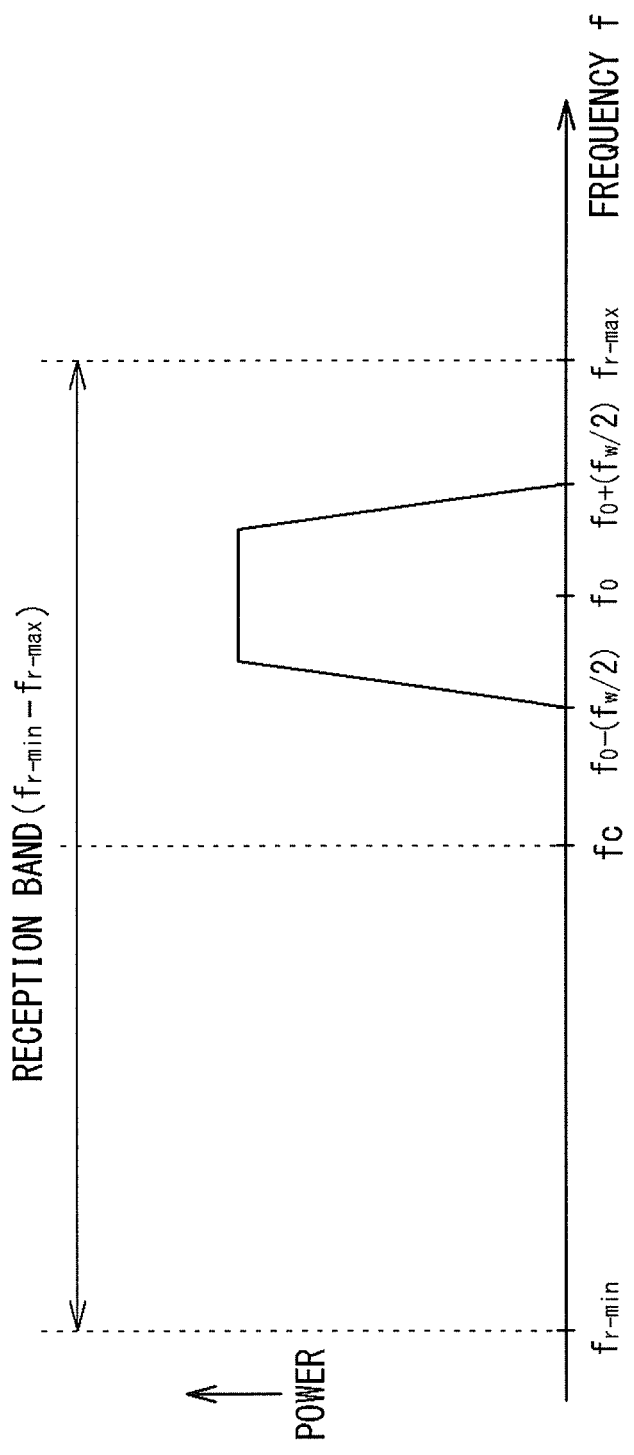
FIG. 15 is a diagram showing a reference signal.

When the mode switching control signal (Chirp/CW signal) that causes the signal generator 10 to generate the chirp signal is given to the switch section 30b of the external signal generator 21, a control voltage $V_{ctrl}$ on which an external signal $V_{ext}$ is superposed is given to the voltage-controlled oscillator 25. Then, the voltage-controlled oscillator 25 outputs a signal (reference signal) having a predetermined bandwidth as shown in FIG. 15.

The bandwidth of the chirp signal can be appropriately determined according to a system bandwidth which is used at the time of operation. For example, multiple patterns of amplitudes of external signals $V_{ext}$ are preset according to system bandwidths, and the amplitude of an external signal $V_{ext}$ is selected according to a selected system bandwidth. Further, the chirp signal bandwidth determined based on the amplitude of the external signal $V_{ext}$ can be finely adjusted by adjusting the ratio between the phase comparison frequency $f_{ref}$ and the frequency of the external signal $V_{ext}$, or adjusting the charge pump current, or adjusting the time constant of the LPF 24 (the fine adjustment can be achieved by performing at least one of the adjustments).

The reference signal is generated as a signal having a predetermined bandwidth $((f_0-(f_w/2))-(f_0+(f_w/2)))$ in a reception band $(f_{r-min}-f_{r-max})$.

The reference signal has a frequency band biased to the higher-frequency side with respect to the reception carrier frequency fc that is the center frequency in the reception band. In FIG. 15, the frequency band of the reference signal exists only on the higher-frequency side with respect to the carrier frequency fc, and does not exist on the lower-frequency side with respect to the carrier frequency fc. In addition, the frequency band of the reference signal is located apart from the carrier frequency fc.

The carrier frequency fc (the center frequency of the reception signal) might be changed. The center frequency $f_0$ and/or the bandwidth $f_w$ of the chirp signal may be adjusted so that the relationship as shown in FIG. 15 is maintained even when the carrier frequency fc is changed.

When the reference signal shown in FIG. 15 passes through the quadrature demodulator 5, quadrature demodulation distortion is added to the reference signal. The quadrature-demodulated signal (I/Q signal) having the quadrature demodulation distortion is sampled in the QDC calculation section 31 (step S2).

The QDC_LLR calculation section 32 calculates a local leakage amount based on the sampled quadrature-demodulated signal (step S3). Since the reference signal has no DC component because of an AC coupling (not shown), if no local leakage occurs, the center of an IQ constellation is supposed to be an original point on an IQ plane. However, if each of the I and Q signals includes an influence of local leakage, the zero point of the constellation of the quadrature-demodulated signal deviates from the original point on the IQ plane.

Figure 16:
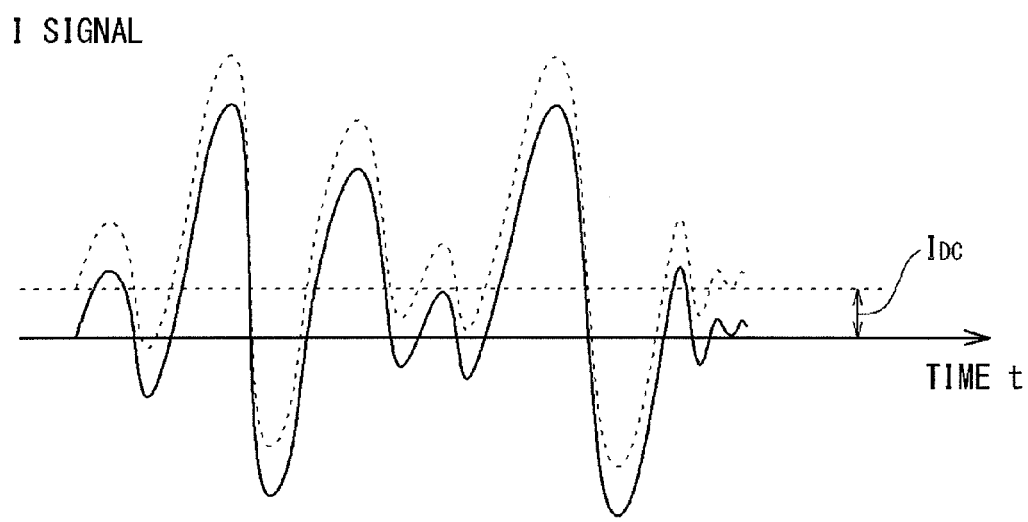
FIG. 16 is a diagram showing an I signal having a DC offset.
Figure 17:
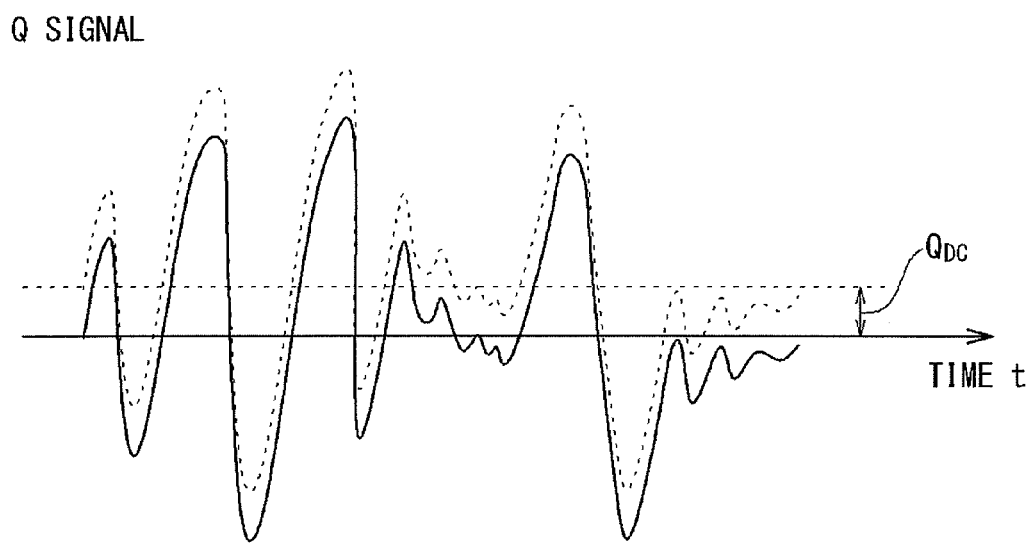
FIG. 17 is a diagram showing a Q signal having a DC offset.

That is, in the case where the I and Q signals include DC components $I_{DC}$ and $Q_{DC}$ due to local leakage as shown in FIG. 16 and FIG. 17, respectively, the DC components $I_{DC}$ and $Q_{DC}$ corresponding to the local leakage are obtained by taking a time average of each of the I and Q signals. Thus obtained DC components $I_{DC}$ and $Q_{DC}$ are used for updating (step S5) of the first compensation parameters $d_{c1}$ and $d_{c2}$ for canceling the local leakage, respectively.

The QDC_IR calculation section 33 calculates an image component based on the sampled quadrature-demodulated signal (step S4).

It is assumed that an I signal in which no image component is caused by the quadrature demodulator 5 is Refsig_re[n], a Q signal in which no image component is caused by the quadrature demodulator 5 is Refsig_Im[n], an I signal in which an image component caused by the quadrature demodulator 5 is superposed on Refsig_re[n] is Rxsig_re[n], and a Q signal in which an image component caused by the quadrature demodulator 5 is superposed on the Refsig_Im[n] is Rxsig_Im[n]. Then, the image components caused by the quadrature demodulator are expressed by Equation 3 shown in FIG. 21(*b*).

In Equation 3, $R_{tmp11}$, $R_{tmp21}$, $R_{tmp22}$, $ktmp_N$, $ktmp_{N-1}$, ..., $ktmp_1$, $ktmp_0$, $ktmp_{-1}$, ..., $ktmp_{-N}$ correspond to the image components.

In Equation 3, *[n] indicates a digital complex baseband IQ signal which is, when the sampling interval is T (sec), sampled at time n×T.

The QDC_IR calculation section 33 calculates the $R_{tmp11}$, $R_{tmp21}$, $R_{tmp22}$, $ktmp_N$, $ktmp_{N-1}$, ..., $ktmp_1$, $ktmp_0$, $ktmp_{-1}$, ..., $ktmp_{-N}$ as the image components.

The QDC_IR calculation section 33 estimates the $R_{tmp11}$, $R_{tmp21}$, $R_{tmp22}$, $ktmp_N$, $ktmp_{N-1}$, ..., $ktmp_1$, $ktmp_0$, $ktmp_{-1}$, ..., $ktmp_{-N}$ in the equation 3 by using an arbitrary numerical calculation method such as a least squares method.

In order to calculate the image components by using the above equation, the QDC_IR calculation section 33, which performs digital processing, needs the digital I and Q signals Refsig_re[n] and Refsig_Im[n] in which no image component is caused by the quadrature demodulator 5, in additions to the output signals Rxsig_re[n] and Rxsig_Im[n] of the quadrature demodulator 5.

As is apparent from the circuit configuration shown in FIG. 1, it is easy for the QDC_IR calculation section 33 performing digital processing to acquire the output signals Rxsig_re[n] and Rxsig_Im[n] of the quadrature demodulator 5. On the other hand, it is not easy for the QDC_IR calculation section 33 to acquire the digital I and Q signals Refsig_re[n] and Refsig_Im[n] in which no image component is caused by the quadrature demodulator 5.

In the receiver 1 according to the present embodiment, however, since replicas of Refsig_re[n] and Refsig_Im[n] can be generated from the output signals Rxsig_re[n] and Rxsig_Im[n] of the quadrature demodulator 5, respectively, it is easy to calculate the image components.

Here, the outputs of the quadrature demodulation compensation section 7 (and the gain compensation section 8) are considered as the outputs of the quadrature demodulator 5.

That is, the following relationships are satisfied:

$R_I$": Rxsigre[n]
$R_Q$": Rxsig_Im[n]

In the receiver 1 according to the present embodiment, when the compensation parameters are calculated, the reference signal (FIG. 15) output from the signal generator 10 is input to the quadrature demodulator 5.

Figure 18:
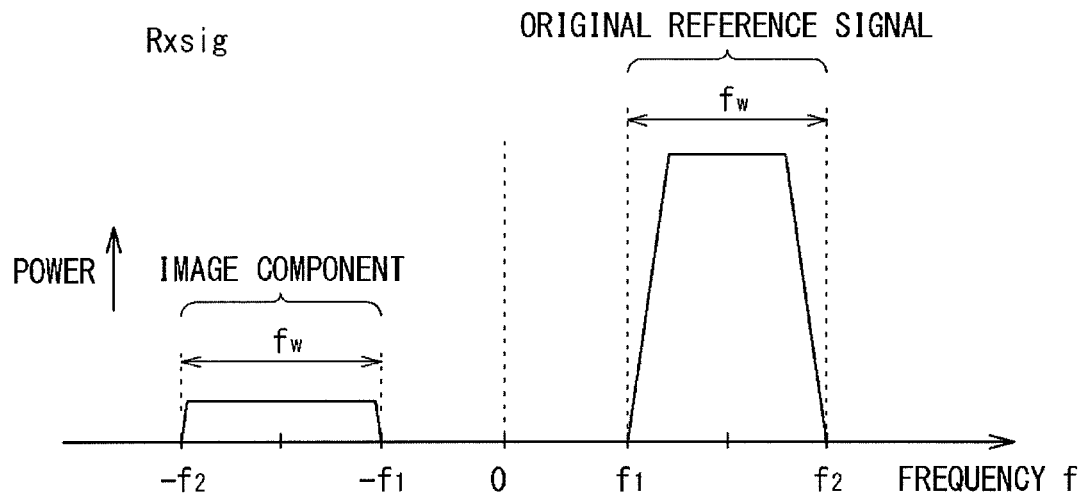
FIG. 18(*a*) is a diagram showing a quadrature-demodulated signal, and FIG. 18(*b*) shows a reference signal replica generated from the quadrature-demodulated signal.
Figure 18:
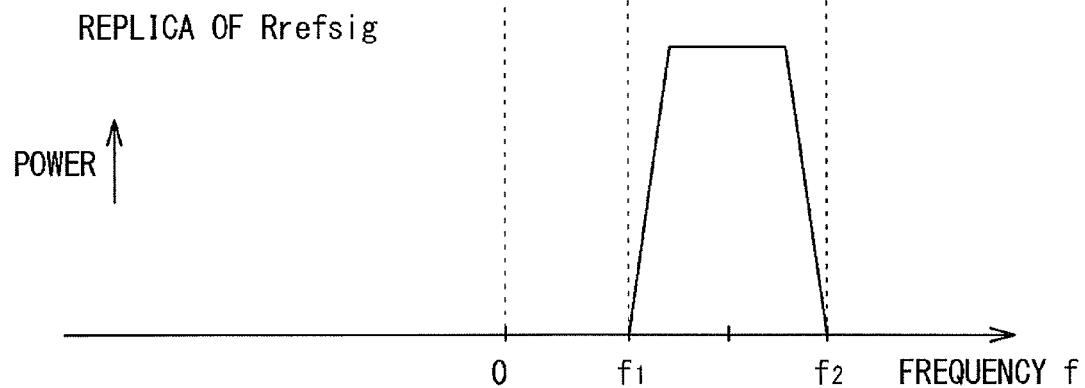

A quadrature-demodulated signal Rxsig[n](=Rxsig_re[n]+i×Rxsig_Im[n]) is obtained when the reference signal passes through the quadrature demodulator 5. In this signal Rxsig[n], as shown in FIG. 18(*a*), a portion corresponding to the original reference signal and a portion corresponding to the image component appear in different positions. The reason is as follows. The frequency band of the reference signal exists only at one side (the higher-frequency side) with respect to the carrier frequency fc, and the image component appears symmetrically to the original reference signal with respect to the carrier frequency fc. That is, the image component appears in a frequency band symmetrical to the frequency band of the reference signal in the frequency direction with respect to the carrier frequency fc.

Since FIG. 18 shows the signal treated in the quadrature demodulation compensation section 7 performing digital processing, the frequency corresponding to the carrier frequency fc is 0.

Since the frequency band of the reference signal exists only on one side (higher-frequency side) with respect to the carrier frequency fc, the QDC_IR calculation section 33 may regard the component existing on the opposite side (lower-frequency side) with respect to the carrier frequency fc, not as a reference signal but as an image component.

Therefore, when acquiring the quadrature-demodulated signal Rxsig[n](=Rxsig_re[n]+i×Rxsig_Im[n]) as shown in FIG. 18(*a*), the QDC_IR calculation section 33 removes, from the quadrature-demodulated signal, the signal on the lower-frequency side relative to the carrier frequency fc (on the lower-frequency side relative to the frequency=0). As shown in FIG. 18(b), in the quadrature-demodulated signal after the removal, no image component exists, and only the reference signal remains.

In the present embodiment, the portion corresponding to the original reference signal and the portion corresponding to the image component appear in different frequencies, and therefore, can be easily separated from each other.

An ideal digital reference signal Refsig[n]=Refsig_re[n]+i×Refsig_Im[n] is a signal obtained by quadrature-demodulating the analog reference signal output from the signal generator 10 by using the quadrature demodulator 5 having no quadrature demodulation distortion, and then converting the analog signal to a digital signal by using the ADCs 6a and 6b. The signal shown in FIG. 18(b) has no image component.

Therefore, the signal shown in FIG. 18(b) is a replica (reference signal replica) of the ideal digital reference signal Refsig[n].

The QDC_IR calculation section 33 calculates parameters indicating the image components $R_{tmp11}$, $R_{tmp21}$, $R_{tmp22}$, $ktmp_N$, $ktmp_{N-1}$, ..., $ktmp_1$, $ktmp_0$, $ktmp_1$, ..., $ktmp_{-N}$ by using the signal (signal for calculation) shown in FIG. 18(a) and the reference signal replica shown in FIG. 18(b).

That is, the QDC_IR calculation section 33 calculates the $R_{tmp11}$, $R_{tmp21}$, $R_{tmp22}$, $ktmp_N$, $ktmp_{N-1}$, ..., $ktmp_1$, $ktmp_0$, $ktmp_{-1}$, ..., $ktmp_{-N}$ by using the acquired quadrature-demodulated signals $R_I''$ and $R_Q''$ as they are, as the image component calculation signals Rxsig_re[n] and Rxsig_Im[n], and using the replica (Replica_Refsig[n]) of the reference signal Refsig[n] as the reference signal Refsig[n](=Refsig_Re[n]+i×Refsig_Im[n]).

The replica of the reference signal Refsig[n] is expressed as follows:

Replica_Refsig[n]=Replica_Refsig_Re[n]+i×Replica_Refsig_Im[n].

In addition, Refsig[n]=α×Replica_Refsig[n] is satisfied (α is a positive real value that is not 0).

Subsequently, the QDC calculation section 31 calculates (updates) the first compensation parameters $d_{c1}$ and $d_{c2}$ for canceling the DC components $I_{DC}$ and $Q_{DC}$ calculated in step S3 (step S5).

Further, the QDC calculation section 31 calculates (updates) the second compensation parameters $R_{11}$, $R_{21}$, and $R_{22}$ and the third compensation parameters $k_N$, $k_{N-1}$, ..., $k_1$, $k_0$, $k_{-1}$, ..., $k_{-N}$ for canceling the image components $R_{tmp11}$, $R_{tmp21}$, $R_{tmp22}$, $ktmp_N$, $ktmp_{N-1}$, ..., $ktmp_1$, $ktmp_0$, $ktmp_{-1}$, ..., $ktmp_{-N}$ estimated in step S4 (step S5). The QDC calculation section 31 gives the calculated first, second and third compensation parameters to the quadrature demodulation compensation section 7.

In the present embodiment, as shown in FIG. 17, the reference signal exists only in the frequency band on the higher-frequency side with respect to the carrier frequency fc. However, the reference signal may exist only in the frequency band on the lower-frequency side with respect to the carrier frequency fc.

Alternatively, the reference signal may have a frequency band biased to either the higher-frequency side or the lower-frequency side with respect to the carrier frequency fc. That is, the reference signal may extend across the carrier frequency fc and be biased to either the higher-frequency side or the lower-frequency side with respect to the carrier frequency fc.

When the reference signal is biased to either the higher-frequency side or the lower-frequency side, a portion on which no image component is superposed is secured in at least a part of the portion corresponding to the original reference signal as shown in FIG. 19(a). By using, as a reference signal replica, the portion on which no image component is superposed, it is possible to estimate the image component.

For example, it is assumed that the frequency band of the reference signal ranges from $-f_1$ to $f_2$ ($f_1 < f_2$) as shown in FIG. 19(a). In this case, the image component appears in the range from $-f_2$ to $f_1$, and overlaps with the reference signal.

Since there is a large level difference between the reference signal and the image component, the QDC_IR calculation section 33 can detect a portion having a level difference equal to or larger than a threshold (e.g., 20 dB) with respect to the reference signal, as a portion where only the image component exists. Thereby, as shown in FIG. 19(b), only the image component existing in the range from $-f_2$ to $-f_1$ can be extracted.

Figure 19:
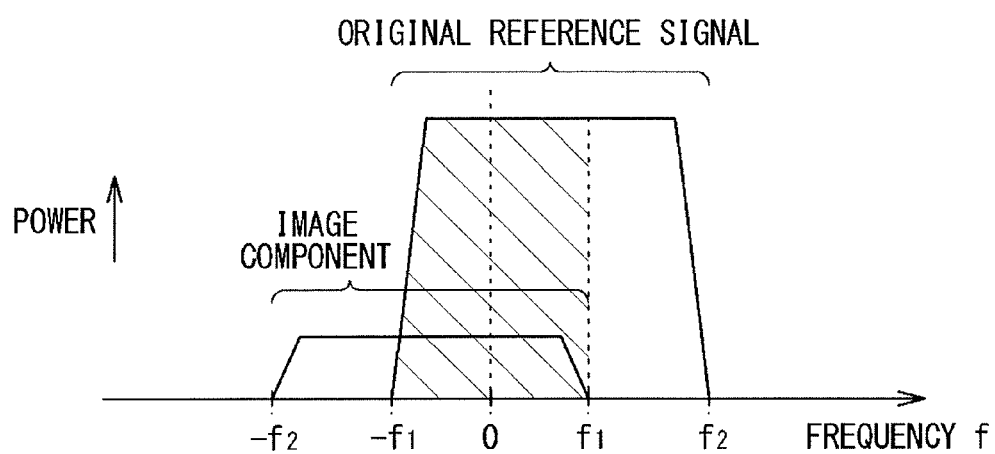
FIG. 19(*a*) is a diagram showing a quadrature-demodulated signal, FIG. 19(*b*) is a diagram showing a signal in which a portion where only an image component exists is extracted, FIG. 19(*c*) is a diagram showing a signal in which a portion where only a reference signal exists is extracted, and FIG. 19(*d*) is a diagram showing a signal obtained by combining the signals shown in FIG. 19(*b*) and FIG. 19(*c*).
Figure 19:
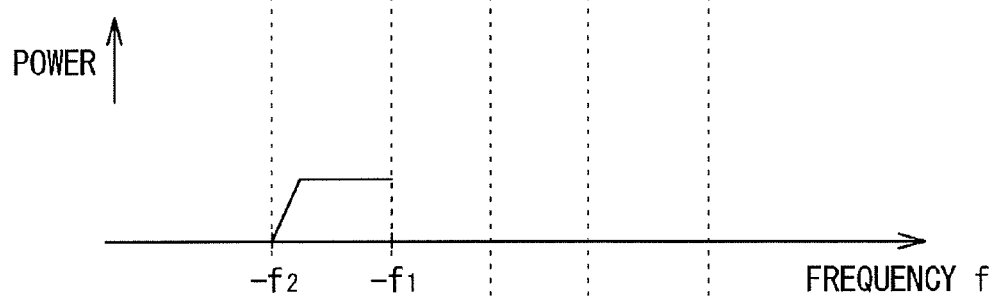
Figure 19:
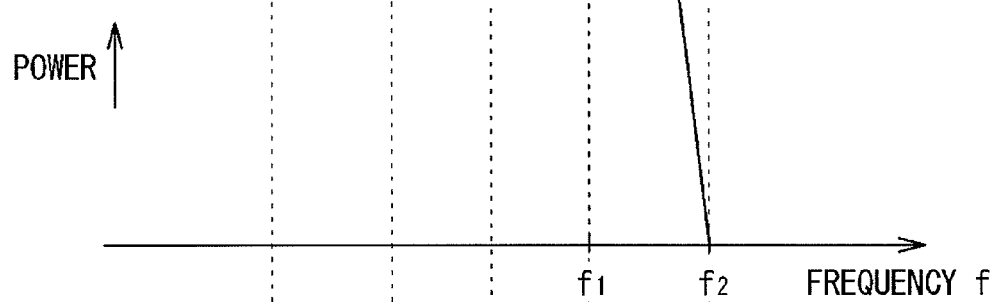
Figure 19:
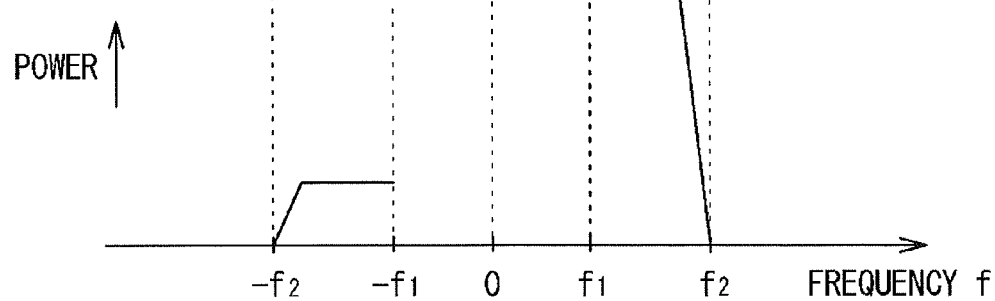

The image component existing in the range from $-f_2$ to $-f_1$ is caused by the reference signal in the range from $f_1$ to $f_2$ which is symmetrical to the image component with respect to the carrier frequency fc (in FIG. 19, frequency=0). In the range from $f_1$ to $f_2$, there is no image component overlapping the reference signal.

Therefore, the QDC_IR calculation section 33 extracts, from the signal shown in FIG. 19(a), the signal in the range from $f_1$ to $f_2$, thereby to obtain (a part of) the reference signal on which no image component is superposed, as shown in FIG. 19(c). The signal shown in FIG. 19(c) (corresponding to a part of the reference signal) may be used as the reference signal replica Replica_Refsig[n].

As the image component calculation signals Rxsig_re[n] and Rxsig_Im[n], a signal shown in FIG. 19(d) may be used, which is obtained by combining the reference signal replica shown in FIG. 19(c) and the signal shown in FIG. 19(b) (the image component caused by the reference signal replica shown in FIG. 19(c)).

As described above, as the reference signal replica used for calculation of the image component, a portion corresponding to the entirety of the reference signal may be used. Alternatively, when the image component is superposed on the reference signal, a portion obtained by removing the portion on which the image component is superposed may be used.

Further, as the signal for calculation, the quadrature-demodulated signal may be used as it is. Alternatively, when the quadrature-demodulated signal includes a portion where the reference signal and the image component overlap each other, the quadrature-demodulated signal from which the overlapping portion is removed may be used.

[3.2 Gain Compensation]

The control section 9 is also able to perform calculation for gain compensation by using a signal (CW) output from the signal generator 10.

As shown in FIG. 13, the RxALC calculation section 34 that calculates compensation values for gain compensation includes a power calculation section 35, a detector output calibration section 36, and a gain calculation section 37.

The RxALC calculation section (measurement section; gain compensation calculation section) 34 measures and monitors the ratio between the power of the signal (CW) output from the signal generator 10 and the powers of the quadrature-demodulated reception signals $R_I''$ and $R_Q''$, thereby to calculate the compensation values for gain compensation in the variable attenuator 3 and/or the gain compensation section 8.

As also shown in FIG. 1, an output of a detector 12 that detects a signal (SW) output from the signal generator 10 is given to the RxALC calculation section 34 via an ADC 12a. In addition, the quadrature-demodulated signals $R_I''$ and $R_Q''$ are given to the RxALC calculation section 34.

Further, an output of a temperature sensor 13 is given to the RxALC calculation section 34 via an ADC 14.

The power calculation section 35 of the RxALC calculation section 34 calculates the reception powers of the quadrature-demodulated signals $R_I''$ and $R_Q''$.

The detector output calibration section 36 calibrates the output of the detector 12 (the power of the signal (CW)) with temperature (the output of the temperature sensor 13), and calculates the calibrated reception power. The detector output calibration section 36 includes a table for temperature calibration, and calculates the calibrated reception power with reference to the table.

The gain calculation section 37 calculates the ratio between the reception power based on the detector output and the reception powers of the quadrature-demodulated signals $R_I''$ and $R_Q''$. The output of the gain calculation section 37 is given to a calculator 38. The calculator 38 calculates a deviation $\Delta$Gain of the output of the gain calculation section 37 from a gain reference value.

Figure 20:
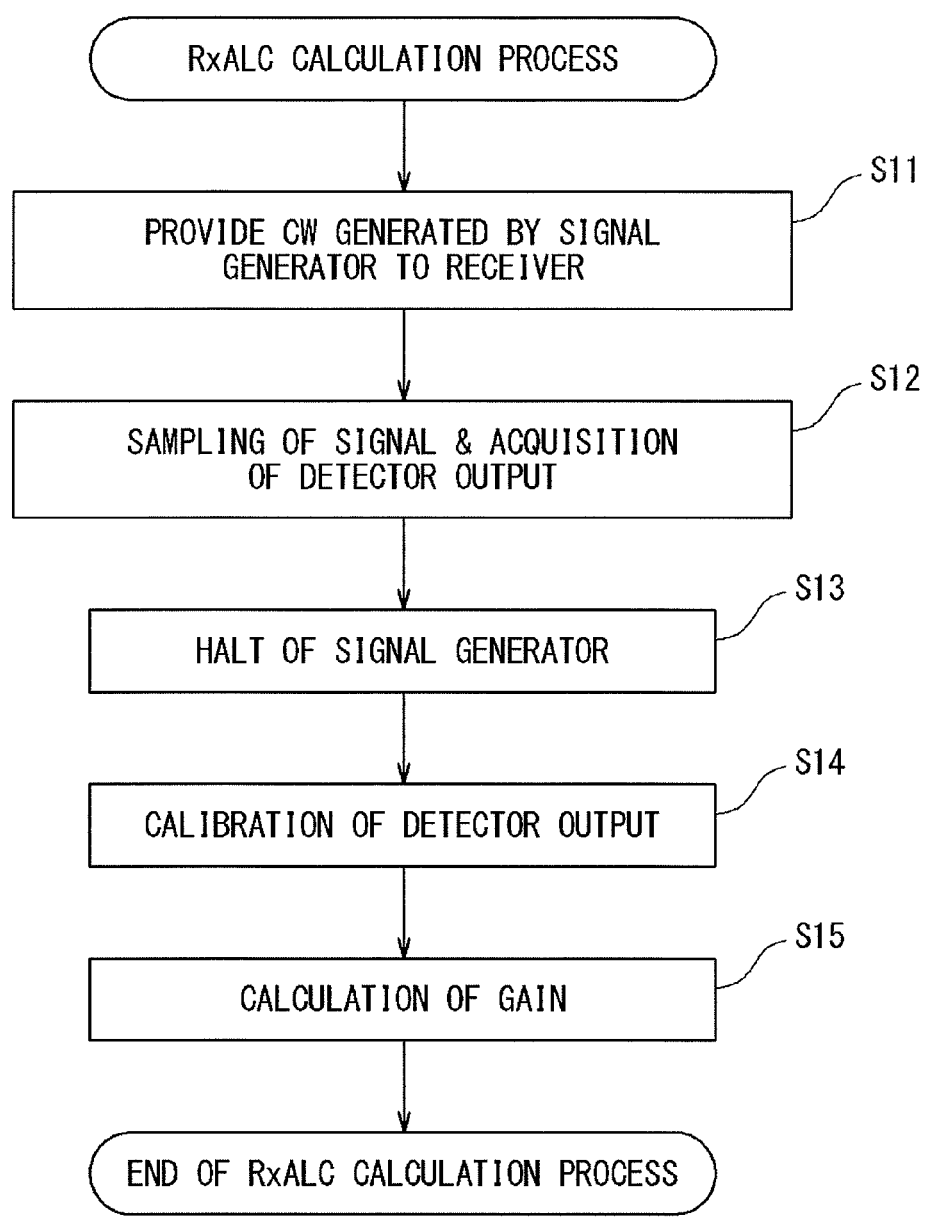
FIG. 20 is a flowchart of an RxALC calculation process.

FIG. 20 shows a flowchart of a process for calculating gains $\Delta$Gain1 and $\Delta$Gain2 to be compensation values for gain compensation in the variable attenuator 3 and/or the gain compensation section 8. First, the control section 9 gives, to the input of the receiver 1, a signal (CW; non-modulated constant wave) generated from the signal generator 10, instead of a usual reception signal (step S11).

If the receiver 1 is provided with a plurality of systems (the circuit shown in FIG. 1) each for processing a reception signal, selection of a system to be a target of calculation of gain compensation should be performed in advance of step S11.

In step S11, the control section 9 outputs, to the switch section 11, a switching control signal that controls the switch section 11 so that the signal generated in the signal generator 10 is given to the amplifier 2 (quadrature demodulator 5) side. Further, the control section 9 outputs a mode switching control signal (Chirp/CW signal) to the external signal generator 21 of the signal generator 10 so that the signal generator 10 is set in the second mode in which the signal generator 10 outputs a single-frequency signal (CW; Constant Wave).

When the switching control signal (Chirp/CW signal) for generating the CW signal is given to the switch section 30b in the external signal generator 21, a control voltage $V_{ctrl}'$ on which an external signal $V_{ext}$ is not superposed is given to the voltage-controlled oscillator 25. Then, the voltage-controlled oscillator 25 outputs a signal of a simple frequency (CW).

The RxALC calculation section 34 performs sampling of the digital quadrature-demodulated signals $R_I''$ and $R_Q''$ which have been obtained by quadrature-demodulating the single-frequency signal (CW) generated by the signal generator 10, and converting the quadrature-demodulated signals into digital signals (step S12). Further, the RxALC calculation section 34 acquires a digital signal which has been obtained by detecting, by the detector 12, the single-frequency signal (CW) generated by the signal generator 10 to obtain a power value (detector output), and converting the power value to a digital signal by the ADC 14 (step S12).

When the signal acquisition in step S12 is ended, the control section 9 causes the signal generator 10 to halt generation of the signal (CW) (step S13). In order to cause the signal generator 10 to halt generation of the signal (CW), a switch 28a provided on the output side of the VCO 25 is switched to a terminal 28b side.

The detector output calibration section 36 calibrates the detector output (power) with reference to the temperature calibration table (step S14).

The power calculation section 35 calculates the time average value of the power of the single-frequency signal (CW) based on the digital quadrature-demodulated signals $R_I''$ and $R_Q''$ obtained by the sampling, and gives the calculation result to the gain calculation section 37.

The gain calculation section 37 calculates the ratio between the power output from the power calculation section 35 and the power output from the detector output calibration section 36, and outputs the ratio (step S15).

The calculator 38 performs calculation by using the power ratio output from the gain calculation section 37, and the gain reference value. The calculator 38 calculates a deviation $\Delta$Gain of the power ratio output from the gain calculation section 37, from the gain reference value. The gain reference value is a value to be a target in adjusting the power ratio output from the gain calculation section 37, and is an ideal power ratio between the detector output and the power of the digital quadrature-demodulated signal.

If the power ratio output from the gain calculation section 37 exceeds the gain reference value, the control section 9 gives, to the variable attenuator 3 and/or the gain compensation section 8, a signal for adjusting the gains of the variable attenuator 3 and/or the gain compensation section 8 so as to eliminate the deviation $\Delta$Gain.

The variable attenuator 3 and/or the gain compensation section 8 operate to adjust the gains based on the signal from the control section 9 so as to eliminate the deviation $\Delta$Gain.

The gain reference value may be, for example, determined in advance, or received from the outside via an input interface.

[4. Appended Notes 1]

The embodiments described above are to be considered in all respects as illustrative and not restrictive. The scope of the present invention is indicated by the appended claims rather than by the foregoing meaning, and all changes which come within the meaning and range of equivalency of the claims are therefore intended to be embraced therein.

Further, among the embodiments described above, at least a part of components described as one embodiment may be combined with at least a part of components described as another embodiment.

[5. Appended Notes 2]

The following is technical means for facilitating rejection of an image component generated due to a quadrature-demodulated signal.

(5-1) A compensation apparatus compensates for a quadrature-demodulated signal output from a quadrature demodulator that performs quadrature demodulation by using a signal of a carrier frequency, by removing an image component caused by the quadrature demodulator from the quadrature-demodulated signal. The compensation apparatus includes: a signal generator that generates a reference signal having a predetermined bandwidth in a reception band, and gives the reference signal to an input side of the quadrature demodulator; a calculation section that calculates a compensation parameter for rejecting the image component, based on a signal obtained by quadrature-demodulating the reference signal with the quadrature demodulator; and an image component rejection section that removes the image component from the quadrature-demodulated signal, based on the compensation parameter. The reference signal includes a frequency band that is biased to either a higher-frequency side or a lower-frequency side with respect to the carrier frequency. The calculation section generates, as a reference signal replica, a signal on which the image component in a frequency domain is not superposed, the signal being a part of the signal obtained by quadrature-demodulating the reference signal and being output from the quadrature demodulator, and the calculation section calculates the compensation parameter, based on a signal for calculation that includes the reference signal replica and an image component caused by the reference signal replica, and on the reference signal replica.

According to the compensation apparatus having the above configuration, the calculation section generates, as a reference signal replica, a signal, which is a part of the signal obtained by quadrature-demodulating the reference signal, on which the image component in the frequency domain is not superposed because the frequency band of the reference signal is biased with respect to the carrier frequency. In addition, the calculation section calculates the compensation parameters, based on a signal for calculation that includes the reference signal replica and an image component caused by the reference signal replica, and on the reference signal replica.

That is, since the reference signal is biased with respect to the carrier frequency, a portion on which no image component is superposed is secured in at least a part of a portion corresponding to the original reference signal. By using the portion on which no image component is superposed, as a reference signal replica, it is possible to estimate the image component. Furthermore, it is possible to calculate compensation parameters for removing the image component.

(5-2) The reference signal preferably exists only in a frequency band on either the higher-frequency side or the lower-frequency side with respect to the carrier frequency. The calculation section preferably generates, as a reference signal replica, a signal having a frequency band corresponding to the entirety of the reference signal, the signal being a part of the signal obtained by quadrature-demodulating the reference signal and being output from the quadrature demodulator. The signal for calculation is preferably the signal obtained by quadrature-demodulating the reference signal.

Since the image component appears symmetrically to the reference signal with respect to the carrier frequency, if the reference signal exists only in a frequency band on either the higher-frequency side or the lower-frequency side with respect to the carrier frequency, the image component appears in a region different from the region where the reference signal appears. Accordingly, the image component and the reference signal can be easily separated from each other.

(5-3) Preferably, the calculation section generates the reference signal replica by removing, from the signal obtained by quadrature-demodulating the reference signal, a signal in a frequency band on the side where the reference signal does not exist with respect to a frequency corresponding to the carrier frequency. Since the image component exists in the frequency band on the side where the reference signal does not exist with respect to the frequency corresponding to the carrier frequency, it is possible to easily generate a reference signal replica having no image component by removing the signal in the frequency band.

(5-4) The reference signal preferably extends across the carrier frequency and is biased to either the higher-frequency side or the lower-frequency side with respect to the carrier frequency. The calculation section preferably generates, as a reference signal replica, a signal obtained by removing a portion on which the image component is superposed, from a signal having a frequency band corresponding to the reference signal, in the signal obtained by quadrature-demodulating the reference signal and output from the quadrature demodulator. The signal for calculation is preferably a signal obtained by removing the portion on which the image component is superposed, from the signal obtained by quadrature-demodulating the reference signal. Even when the reference signal extends across the carrier frequency, if the reference signal is biased to either the higher-frequency side or the lower-frequency side with respect to the carrier frequency, a portion on which no image component is superposed is secured in at least a part of the portion corresponding to the original reference signal. By using the portion on which no image component is superposed, as a reference signal replica, it is possible to estimate the image component.

(5-5) The signal generator is preferably a phase lock loop type signal generator in which an oscillation frequency of a voltage-controlled oscillator is determined by a control voltage based on an output signal of a phase comparator, and includes an external signal generation section that generates an external signal that varies with time. The control voltage is preferably obtained by superposing the external signal on the output signal of the phase comparator. By superposing the external signal that temporally varies on the output signal of the phase comparator, it is possible to generate a signal whose frequency temporally varies. The signal whose frequency temporally varies can be regarded as a signal having a frequency bandwidth if time is ignored. That is, the above signal generator can easily generate a signal having a frequency bandwidth.

(5-6) The compensation apparatus preferably further include a switch section that performs switching between a first mode where the control voltage in which the external signal is superposed on the output signal of the phase comparator is given to the voltage-controlled oscillator, and a second mode where the control voltage in which the external signal is not superposed on the output signal of the phase comparator is given to the voltage-controlled oscillator. In this case, a signal having a bandwidth due to temporal variation in frequency can be generated in the first mode, and a signal having a constant frequency can be generated in the second mode.

(5-7) Wireless communication equipment includes the compensation apparatus described in the above (5-1).

(5-8) Wireless communication equipment according to another aspect includes the compensation apparatus described in the above (5-5). The compensation apparatus further includes: a switch section that performs switching between a first mode where the control voltage in which the external signal is superposed on the output signal of the phase comparator is given to the voltage-controlled oscillator, and a second mode where the control voltage in which the external signal is not superposed on the output signal of the phase comparator is given to the voltage-controlled oscillator; and a measurement section that measures a gain of the receiver by giving, to the receiver, a signal of a single frequency that has been output from the signal generator in the second mode.

REFERENCE SIGNS LIST 1 communication equipment (receiver)
2 amplifier
3 variable attenuator
4 frequency converter
5 quadrature demodulator
5a oscillator
5b phase shifter
5c, 5d multiplier
6a, 6b ADC
7 quadrature demodulation compensation section
7a local leakage rejection section
7b image component rejection section
7c asymmetry equalizer (delay section)
8 gain compensation section
9 control section
10 signal generator 11 switch section
12 detector
13 temperature sensor
21 external signal generator
22 phase comparator
23 charge pump circuit
24 low-pass filter
25 voltage-controlled oscillator
26 frequency divider
28 input line
30 non-inverting amplifier
30a variable resistor
30b switch
30c capacitor
31 QDC calculation section
32 local leakage calculation section
33 image component calculation section
34 gain compensation calculation section (measurement section)
35 power calculation section
35 reception power calculation section
36 detector output calibration section
37 gain calculation section
38 calculator
51a, 51b amplifier
53a first LPF (first filter)
53b second LPF (second filter)
71 first delay processing section
72 second delay processing section

The invention claimed is:

1. A compensation apparatus configured to perform a compensation process of removing an image component in a quadrature-demodulated signal, the compensation apparatus including
a quadrature demodulation compensation section configured to compensate for the quadrature-demodulated signal including an I signal and a Q signal, wherein
the quadrature demodulation compensation section comprises:
an image component rejection section that removes a first image component caused by a quadrature demodulator that outputs the quadrature-demodulated signal, and
an equalizer for delay compensation that removes a second image component caused by a characteristic difference between frequency characteristic of a first filter that performs filtering of the I signal and frequency characteristic of a second filter that performs filtering of the Q signal, the second image component being a component that is not removable by the image component rejection section.

2. The compensation apparatus according to claim 1, wherein
the first filter and the second filter are analog filters, and
the quadrature demodulation compensation section is configured to receive digital signals into which the analog I and Q signals output from the first filter and the second filter have been converted, and perform the compensation process by digital signal processing.

3. Wireless communication equipment including the compensation apparatus according to claim 1.

4. A compensation apparatus configured to perform a compensation process of removing an image component in a quadrature-demodulated signal, the compensation apparatus including
a quadrature demodulation compensation section configured to compensate for the quadrature-demodulated signal including an I signal and a Q signal, wherein
the quadrature demodulation compensation section is configured to perform a compensation process of compensating for a characteristic difference between frequency characteristic of a first filter that performs filtering of the I signal and frequency characteristic of a second filter that performs filtering of the Q signal,
the quadrature demodulation compensation section includes a delay section configured to perform delay processing for at least one of the I signal and the Q signal, and
the delay section suppresses a group delay difference between a group delay caused by the first filter and a group delay caused by the second filter.

5. The compensation apparatus according to claim 4, wherein
the delay section includes:
a first delay processing section configured to perform delay processing for one of the I signal and the Q signal; and
a second delay processing section configured to perform delay processing for the other one of the I signal and the Q signal,
the first delay processing section is configured to cause a delay of a predetermined delay amount in the one signal, and
the second delay processing section is configured to be able to perform a first process of causing a delay of a delay amount smaller than the predetermined delay amount of the delay caused by the first delay processing section, and a second process of causing a delay of a delay amount larger than the predetermined delay amount of the delay caused by the first delay processing section.

6. The compensation apparatus according to claim 5, wherein
when the first filter and the second filter each have an order of N, the second delay processing section has an order set to 2N or lower.

* * * * *